US007016297B2

(12) United States Patent
Tang et al.

(10) Patent No.: US 7,016,297 B2
(45) Date of Patent: Mar. 21, 2006

(54) METHOD AND APPARATUS PROVIDING DECENTRALIZED, GOAL-ORIENTATED ADAPTIVE LEARNING IN AN ADAPTIVE ORTHOGONAL FREQUENCY DIVISION MULTIPLEX COMMUNICATION SYSTEM

(76) Inventors: Clive K Tang, 145 Cimarron trail, Apt. 2238, Irving, TX (US) 75063; Victor J Stolpman, 2711 W. Royal La., Apt. 702, Irving, TX (US) 75063

( * ) Notice: Subject to any disclaimer, the term of this patent is extended or adjusted under 35 U.S.C. 154(b) by 124 days.

(21) Appl. No.: 10/732,066

(22) Filed: Dec. 10, 2003

(65) Prior Publication Data

US 2005/0128935 A1    Jun. 16, 2005

(51) Int. Cl.
*H04J 9/00*    (2006.01)
*G05B 19/418*    (2006.01)
(52) U.S. Cl. ..................................... 370/204; 700/248
(58) Field of Classification Search .................... None
See application file for complete search history.

(56) References Cited

U.S. PATENT DOCUMENTS

| | | | |
|---|---|---|---|
| 6,385,462 B1 * | 5/2002 | Baum et al. ................. | 455/522 |
| 6,751,187 B1 * | 6/2004 | Walton et al. .............. | 370/210 |
| 6,904,335 B1 * | 6/2005 | Solomon ..................... | 700/247 |
| 2002/0099529 A1 | 7/2002 | Tang ........................... | 703/22 |
| 2003/0072395 A1 * | 4/2003 | Jia et al. ..................... | 375/341 |
| 2005/0031047 A1 * | 2/2005 | Maltsev et al. ............. | 375/260 |

FOREIGN PATENT DOCUMENTS

WO    WO-02/45274 A2    6/2002
WO    WO-02/45274 A3    6/2002

OTHER PUBLICATIONS

Narendra, cited on attatched IDS.*
"Adaptive OFDM for wideband radio channels", zylwik, Andreas, IEEE GLOBECOM 96, Nov. 18-22, 1996 vol. 1, pp. 713-718.
"Computationally Efficient Optimal Power Allocation Algorithms for Multicarrier Communication Systems", Krongold, B.S., et al., IEEE Trans. On Communications, vol. 48, No. 1, 2000, pp. 23-27.
"A Blockwise Loading Algorithm for the Adaptive Modulation Technique in OFDM Systems", Grunheid, R., et al., IEEE 54th Vehicular Technology Conference, Oct. 2001, vol. 2,pp. 948-951.

(Continued)

*Primary Examiner*—Huy D. Vu
*Assistant Examiner*—Cynthia L. Davis
(74) *Attorney, Agent, or Firm*—Harrington & Smith, LLP

(57) ABSTRACT

Disclosed is an OFDM communications system and a method of operating the OFDM communications system. The system includes an OFDM transmitter for transmitting data over a plurality of OFDM sub-channels, where the OFDM transmitter has a plurality of modulators of different types. The system further includes an OFDM receiver for receiving the data from the plurality of OFDM sub-channels, where the OFDM receiver has a plurality of corresponding demodulators of the different types. The system further includes, in accordance with this invention, an adaptive learning automata that contains a group or team of independent, decentralized automaton operating in accordance with a game theory-based approach. Each of the plurality of automaton are responsible for managing one MCS switching threshold value so as to maximize at least one selected performance criterion. The OFDM transmitter is responsive to the MCS switching thresholds for selecting an appropriate one or ones of said modulators for modulating the data for various ones of the sub-channels.

30 Claims, 17 Drawing Sheets

OTHER PUBLICATIONS

"Adaptive Modulation Techniques for Duplex OFDM Transmission", Keller, T., et al., IEEE Trans. On Vehicular Technology, vol. 49, No. 5, Sep. 2000, pp. 1893-1906.

"High Bit Rate Transmission Scheme with a multilevel Transmit Power Control for the OFDM based Adaptive Modulation Systems", Yoshiki, Tomoaki, et al., IEEE 53rd Vehicular Technology Conference, May 2001, vol. 1, pp. 727-731.

"Adaptive Control of Link Adaptation for High Speed Downlink Packet Access (HSDPA) W-CDMA", Nakamura, M., et al., IEEE 5th International Symposium on Wireless Personal Multimedia Communications, Oct. 2002, vol. 2, pp. 382-386.

"Performance of an OFDM-TDMA Mobile Commuication System", Rohling, H., IEEE, May 1996, pp. 1589-1593.

"Stochastic and Deterministic Averaging Processors", Mars et al., Peter Peregrinus Ltd., 1981, pp. 82-120.

"Information Theory and Reliable Communication", R.G. Gallager, John Wiley & Sons, Inc., New York, 1968, pp. 316-441.

"OFDM for Wireless Multimedia Communications", R. van Nee and R. Prasad, Artech House, Boston, Jan. 2000, pp. 14-53.

"Learning Automata", Narendra et al., Prentice Hall, Englewood Cliffs, New Jersey, 1989, pp. 103-197.

"Use of Stochastic Automata for Parameter Self-Optimization with Multimodal Performance Criteria", Shapiro et al., IEEE Transactions On Systems Science and Cybernetics, vol. 5, No. 4, Oct. 1969.

"Learning Automata An Introduction", Narendra, Kumpath S. et al., 1989 Prentice-Hall, Inc., pp. 103-147.

* cited by examiner

| THRESHOLD COMBINATIONS | L1 IN dB | L2 IN dB |
|---|---|---|
| SET 1 | −2 | 6 |
| SET 2 | −2 | 10 |
| SET 3 | 2 | 6 |
| SET 4 | 2 | 10 |

FIG.18

METHOD AND APPARATUS PROVIDING DECENTRALIZED, GOAL-ORIENTATED ADAPTIVE LEARNING IN AN ADAPTIVE ORTHOGONAL FREQUENCY DIVISION MULTIPLEX COMMUNICATION SYSTEM

TECHNICAL FIELD

This invention relates generally to wireless communications systems and, more specifically, relates to both mobile and fixed wireless communications systems that employ Orthogonal Frequency Division Multiplex (OFDM) techniques.

BACKGROUND

Frequency division multiplexing (FDM) is a technology that transmits multiple signals simultaneously over a single transmission path, such as a cable or wireless system. Each signal travels within its own unique frequency range (carrier), which is modulated by the data (text, voice, video, etc.).

An orthogonal FDM (OFDM) spread spectrum technique distributes the data over a large number of carriers that are spaced apart at defined frequencies. This spacing provides the "orthogonality" of the OFDM approach, and prevents the demodulators from seeing frequencies other than their own. The benefits of OFDM include high spectral efficiency, resiliency to RF interference, and lower multipath distortion. This is useful because in a typical terrestrial wireless communications implementation there are multipath channels (i.e., the transmitted signal arrives at the receiver using various paths of different length). Since multiple versions of the signal interfere with each other (inter-symbol interference (ISI)), it becomes difficult to extract the original information.

OFDM has been successfully deployed in indoor wireless LAN and outdoor broadcasting applications. OFDM beneficially reduces the influence of ISI with a complexity that is less than that of typical single carrier adaptive equalizers. OFDM has also been found to work well in multipath fading channels. These and other advantages render OFDM a strong candidate for use in future mobile communication systems, such as one being referred to as 4G (fourth generation).

In a frequency selective fading channel each sub-carrier is attenuated individually. The resultant sub-channel frequency functions are frequency-variant and may also be time-variant, i.e. the channel magnitude may be highly fluctuating across the sub-carriers and may vary from symbol to symbol. Hence, adaptive modulation may be used to advantage to improve the error performance and data throughput (TP) in an OFDM modem (modulator/demodulator) by assigning different modulation and coding schemes to different sub-carriers.

However, one fundamental issue in deploying adaptive modulation is to determine what modulation and coding scheme (MCS) to use. For a system with several pre-defined MCS available, the problem may be viewed as the determination of switching thresholds, i.e., when to switch from using one MCS to using another MCS. Virtually all past investigations into this problem that are known to the inventors were based on heuristic methods, or employed limited analytical resources, usually under un-coded conditions.

One approach from the literature is a so-called "target BER approach", as described by H. Rohling and R. Grunheid, "Performance of an OFDM-TDMA Mobile Communication System", IEEE 46th Vehicular Technology Conference, Apr. 28 to May 1, 1996, Volume 3, pp. 1589–1593; and A. Czylwik, "Adaptive OFDM for Wideband Radio Channels", IEEE GLOBECOM 96, Nov. 18–22, 1996, Volume 1, pp. 713–718. In the target BER approach the thresholds are set to be the signal-to-noise ratios (SNRs) needed for the given modulation and coding schemes in order to meet a target BER. While this approach may insure that a target BER is achieved, but does not maximize the data throughput. Another prior art method treats the issue as a parameter optimization problem and employs analytical optimization techniques (see, for example, B. S. Krongold, K. Ramchandran and D. L. Jones, "Computationally Efficient Optimal Power Allocation Algorithms for Multicarrier Communication Systems", IEEE Trans. on Communications, Vol.48, No. 1, 2000, pp. 23–27). In this approach one would typically seek to maximize the data rate (bits/OFDM symbol) subject to a BER/SER bound and other constraints (e.g. power). However, this approach does not necessarily mean that the net throughput is optimized, especially in a packet-based system. Moreover, this approach is tailored for a specific modulation scheme, channel condition and operating constraints, and needs to be re-evaluated if any one of them changes.

Discussing these prior art approaches now in further detail, in the "targeted BER approach" the thresholds are derived from the BER curves under AWGN. In such an approach a set of Gaussian BER curves for the available MCSs is plotted, and the SNR thresholds are read from the graph for a target BER. While this approach may insure a certain maximum tolerable BER, it has no control over the resultant throughput, which may be a more important performance criterion in some applications, e.g., when downloading files. Variants on the targeted BER approach are also available, for example the thresholds may be shifted according to the mean SNR across a block of sub-carriers (see, for example, R. Grunheid, E. Bolinth and H. Rohling, "A Blockwise Loading Algorithm for the Adaptive Modulation Technique in OFDM Systems", IEEE 54th Vehicular Technology Conference, October 2001, Volume 2, pp. 948–951), or one may estimate the overall BER for all available modulation schemes in a group of sub-carriers and select the scheme that gives the highest throughput while also satisfying a BER bound (see, for example, T. Keller and L. Hanzo, "Adaptive Modulation Techniques for Duplex OFDM Transmission", IEEE Trans. on Vehicular Technology, Vol. 49, No. 5, September 2000, pp.1893–1906), or one may adjust the power of the individual sub-carriers to reduce the excessive margin (see, for example, T. Yoshiki, S. Sampei and N. Morinaga, "High Bit Rate Transmission Scheme with a Multilevel Transmit Power Control for the OFDM based Adaptive Modulation Systems", IEEE 53rd Vehicular Technology Conference, May 200 1, Volume 1, pp. 727–731).

The other technique, i.e., the "parameter optimization approach", formulates the modulation selection issue as a parameter optimization problem. The aim is to optimize the rate (bits/symbol) subject to a number of constraints. For instance, Krongold et al. (B. S. Krongold, K. Ramchandran and D. L. Jones, "Computationally Efficient Optimal Power Allocation Algorithms for Multicarrier Communication Systems", IEEE Trans. on Communications, Vol.48, No. 1,2000, pp.23–27) proposed a Lagrange bisection solution that maximizes the rate (bits/symbol) subject to a total power constraint and a fixed error probability bound. An additional practical constraint is that the rate should be an integer number of bits/symbol. Unfortunately, channel coding, which is frequently employed to combat fading, may be difficult to incorporate in such an analytical approach. A certain channel distribution is also often assumed, in other words the derived solution only works for a given channel condition and should be re-evaluated when the channel changes. Moreover, in a packet-data based system with channel coding, it may be more desirable to maximize the net data throughput, defined as (1-PER)*data_rate, where data_rate is the actual data rate in packets/symbols per time unit (or other normalized values), rather than the raw data rate, and PER is the Packet Error Rate. However this is difficult to perform analytically. In fact, little or no literature is available that deals with packet errors and the associated optimization of throughput for a coded OFDM system.

In general, analytical modeling is basically inaccurate, and may at best be simply an approximation of many practical operating conditions. The heuristic method is often subjective, represents but one of the many solutions available, and may not provide the most optimal performance.

Based on the foregoing, it should be appreciated the problem of optimally making adjustments of MCS switching thresholds in an adaptive OFDM modem, to improve or maximize data throughput, has not been adequately resolved.

SUMMARY OF THE PREFERRED EMBODIMENTS

The foregoing and other problems are overcome, and other advantages are realized, in accordance with the presently preferred embodiments of these teachings.

In accordance with this invention an OFDM system and method operates in an on-line adaptive mode to dynamically alter, using a plurality of controllers operating in a cooperative game mode, the MCS switching thresholds as the channel conditions vary. The approach of this invention is of a generic nature, and is not tailored for a specific environment or channel conditions. As a result, the approach of this invention has a wide applicability and may be applied to different system configurations and scenarios, especially when channel coding is employed. The appropriate adjustment of the switching thresholds improves the error performance and the data throughput, both of which can result in an increase in system capacity.

Disclosed herein is an OFDM communications system and a method of operating the OFDM communications system. The system includes an OFDM transmitter for transmitting data over a plurality of OFDM sub-channels, where the OFDM transmitter has a plurality of modulators of different types. The system further includes an OFDM receiver for receiving the data from the plurality of OFDM sub-channels, where the OFDM receiver has a plurality of corresponding demodulators of the different types. The system further includes, in accordance with this invention, an adaptive learning automata that contains a group or team of independent, decentralized automaton operating in accordance with a game theory-based approach. Each of the plurality of automaton are responsible for managing one MCS switching threshold value so as to maximize at least one selected performance criterion. The OFDM transmitter is responsive to the MCS switching thresholds for selecting an appropriate one or ones of said modulators for modulating the data for various ones of the sub-channels.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 18 is a table showing MCS threshold combinations and exemplary threshold values;

DETAILED DESCRIPTION OF THE PREFERRED EMBODIMENTS

By way of introduction, one technique for deploying adaptive modulation in an OFDM modem, in order to take advantage of the sub-channel frequency diversity, is to examine the individual sub-channel condition (via its SNR as a metric, for example) and then assign an appropriate modulation and coding scheme to that sub-channel. Therefore a basic issue is to determine how to select the appropriate MCS. For a system in which several pre-defined MCSs are available, the issue essentially amounts to when to switch from one MCS to another, i.e. the determination of switching thresholds. This invention provides an adaptive learning technique that is capable of adjusting the MCS switching thresholds dynamically to improve or maximize the throughput. Unlike the prior art that is either heuristic or information theory based, this invention uses an adaptive control approach. An aspect of the adaptive control approach is that the switching thresholds are adjusted in a closed-loop configuration using a performance-goal orientated adaptive scheme that aims to maximize a specific performance function (e.g., throughput). The invention employs a decentralized learning method to implement the adaptive scheme.

Figure 5:
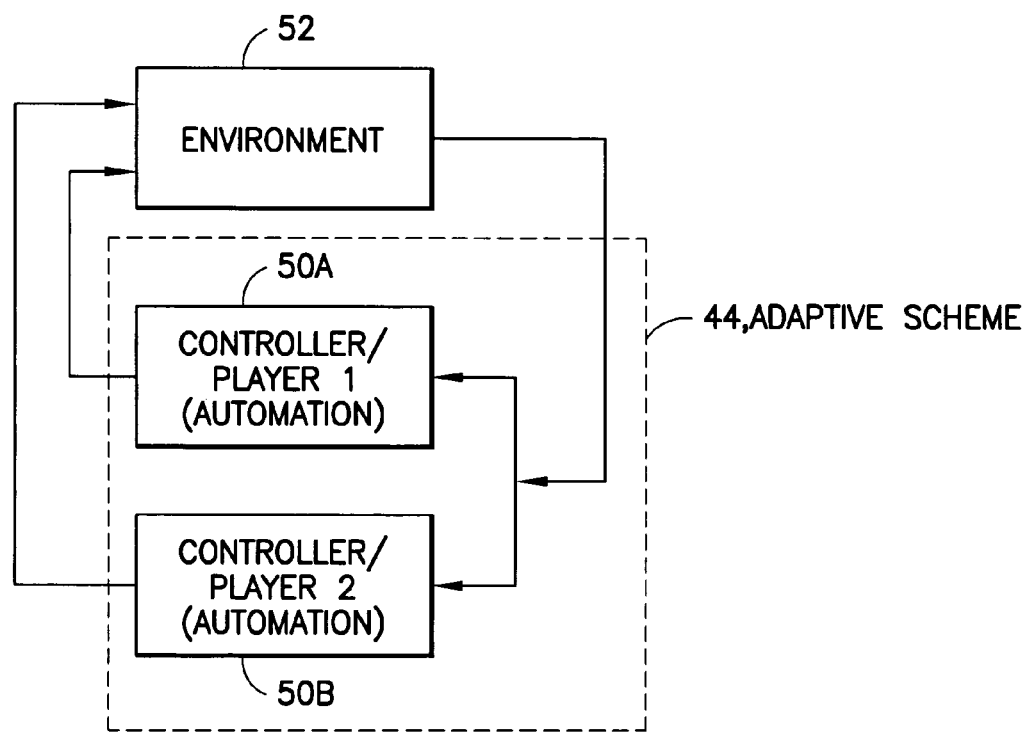
FIG. 5 illustrates a cooperative game of two players with a common pay-off.
Figure 7:
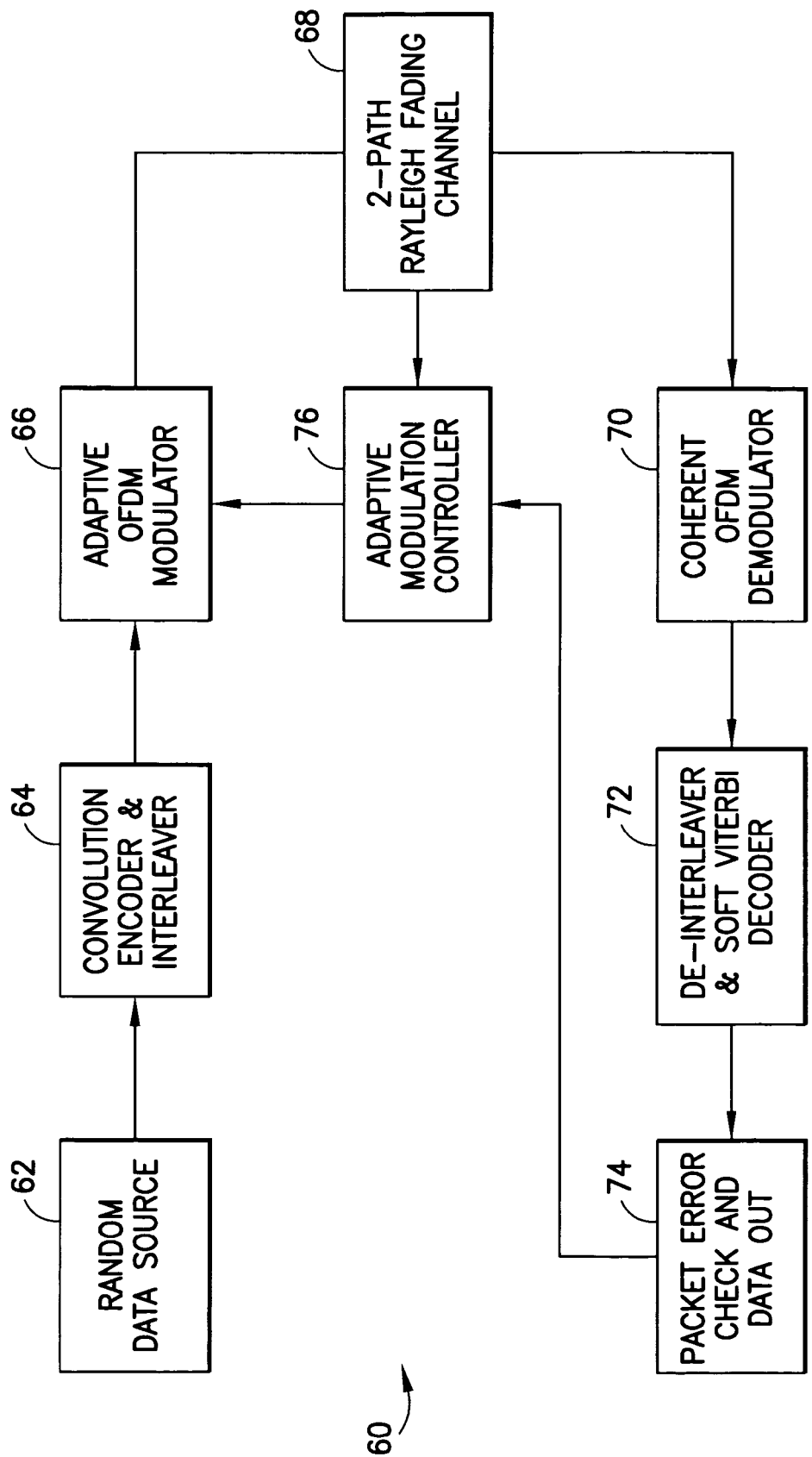
FIG. 7 is a block diagram of adaptive OFDM system.

As will be described below in further detail, the adaptive learning scheme uses a plurality of independent controllers, one controller for each threshold, configured in a co-operative game mode. In such a mode, and as is shown in FIG. 5, the controllers 50A, 50B are regarded as players (Player 1, Player 2) of a sequential game with the operating environment 52. These controllers or players 50 are also referred to below as automatons, and the elements 50 may be interchangeably referred to herein as controllers, players or automatons, depending on the context. At each play of the game each player 50 chooses an action, that maps into a threshold value, based on its own strategy, and applies that action to the environment 52. In response to the set of actions, the environment 52 returns to the players 50 a single common pay-off (outcome) as a performance measure to direct the learning process. The learned information is considered as an experience of the player 50 to improve the quality of control whenever similar situations occur. By suitably mapping the desired performance function as the outcome, and choosing an appropriate learning module, it is possible to accomplish multiple switching threshold optimization for an adaptive OFDM system operating in a random environment (e.g. fading channels), such as is depicted in FIG. 7.

Another aspect of this invention is that it does not make any assumptions as to the operating environment, i.e., no specific knowledge of the fading channel conditions or modulation and coding techniques need be assumed. This is an important practical advantage over analytical techniques, as analytic techniques often are required to assume a certain channel distribution, and may not readily accommodate various channel coding cases. This invention also does not need the throughput to be available as an analytical function of the switching thresholds, which is typically unavailable in most practical systems. These features render the performance-goal orientated approach of this invention more generic and independent of the underlying modulation and coding schemes, and it thus possesses a wider applicability to various system configurations and channel conditions.

This invention can be implemented in either the transmitter or the receiver, or in both, of an OFDM system using software, hardware, or a combination of software and hardware. The software is assumed to be embodied as program code and stored in a computer-readable medium that directs the operation of a data processor, such as a digital signal processor (DSP) and/or a general purpose data processor that is resident at either one or both of the transmitter 12A and receiver 12B. A hardware synthesis of a learning automaton using basic logic elements is known from the literature (see, for example, P. Mars and W. J. Poppelbaum, "Stochastic and Deterministic Averaging Processors", Peter Peregrinus, 1981). A performance function (e.g. throughput) may be evaluated at the receiver and fed back to the transmitter for use by the adaptive learning technique of this invention. Alternatively, the adaptive learning technique of this invention may be implemented at the receiver and the switching threshold values sent to the transmitter. In either case a two-way signaling path is assumed to exist between the transmitter and receiver to carry the necessary control information, for example the channel conditions. In some embodiments it may be desirable to use blind detection to reduce the amount of signaling.

Figure 1:
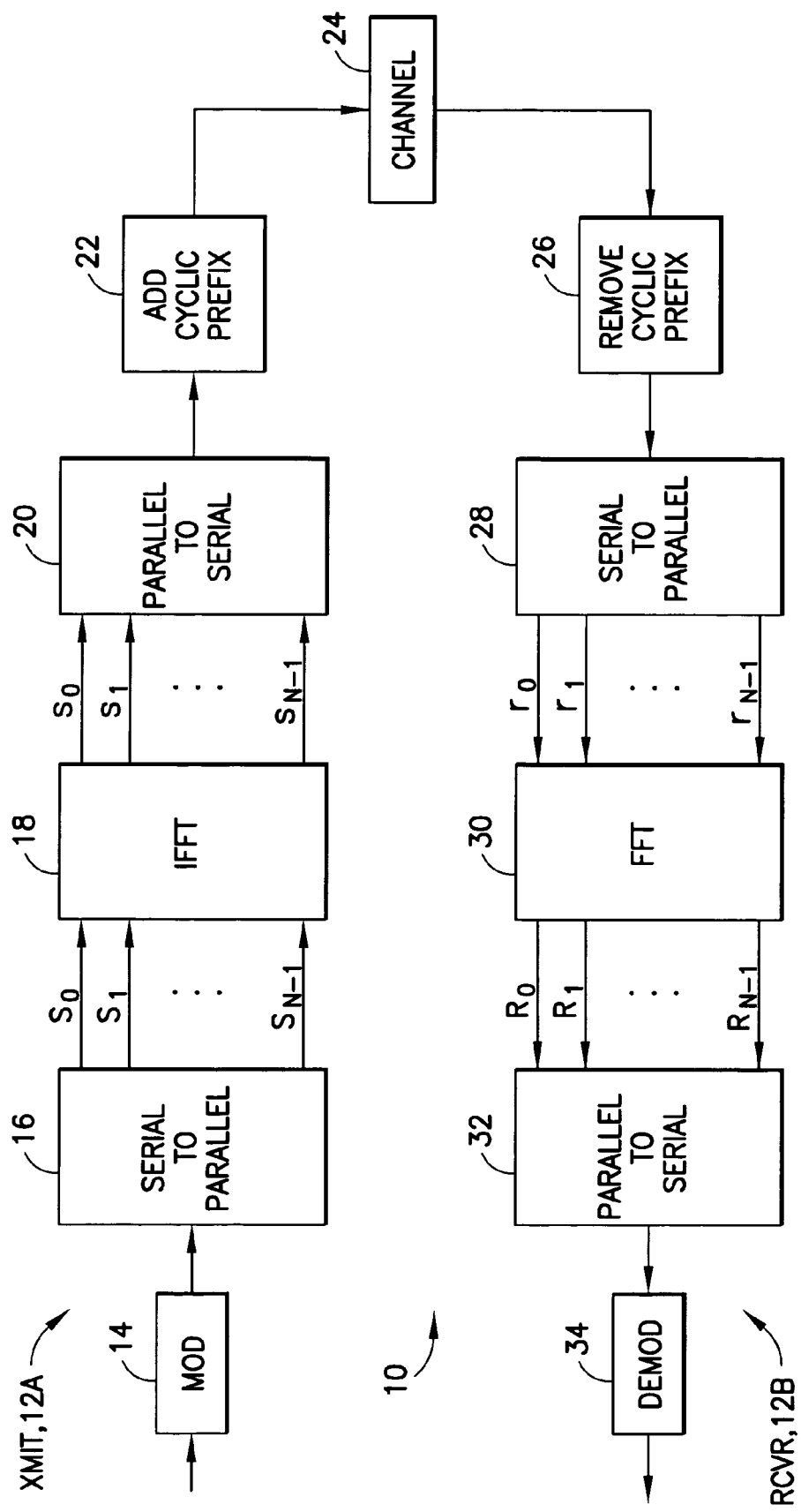
FIG. 1 is simplified block diagram of an N sub-carrier OFDM modem.

A block diagram of a N sub-carrier OFDM modem 10, also referred to herein as an OFDM transceiver or an OFDM system, is shown in FIG. 1. At the transmitter 12A a modulator 14 sends N complex symbols $S_n$, $0 \leq n \leq N-1$, that are multiplexed in a serial to parallel converter 16 to N sub-carriers. An Inverse Fast Fourier Transform (IFFT) block 18 translates the N frequency-domain symbols into N time-domain samples $s_n$, $0 \leq n \leq N-1$ that are applied to a parallel to serial converter 20, after which M cyclic prefix samples are inserted by block 22 before being transmitted over a time-varying and noise-corrupted channel 24. An OFDM symbol thus consists of N symbols in the frequency-domain, or N+M samples in the time-domain. At the receiver 12B the cyclic prefix is stripped from the received time-domain samples in the block 26, and the output is applied to a serial to parallel converter 28 that outputs the remaining data samples $r_n$, $0 \leq n \leq N-1$. The separate received symbols are then input to a FFT block 30 to yield the received frequency-domain data symbols $R_n$, $0 \leq n \leq N-1$. The data symbols are then input to a parallel to serial converter 32, and the resulting symbol stream is then applied to a demodulator 34.

The impulse response of the channel is assumed to be constant for the duration of an OFDM symbol, therefore it can be characterized during such a period by the N-point Fourier Transform of the impulse response, which is referred to as the frequency domain channel transfer function (or more simply as the channel frequency function) $H_n$. For each sub-carrier n, the received complex data symbols can be expressed as, $$R_n = S_n \cdot H_n + n_n \qquad (1)$$

where $n_n$ is an AWGN sample. Since the noise energy in each sub-carrier is independent of the channel frequency function, the local signal-to-noise ratio $SNR_n$ in sub-carrier n can be expressed as, $$SNR_n = |H_n|^2 \cdot SNR \qquad (2)$$

where SNR is the overall signal-to-noise ratio. If no inter-sub-carrier-interference (ICI) or other impediments occur, then the value of $SNR_n$ determines the bit error probability for the sub-carrier n, and hence it may be used as a metric to assess the sub-channel condition.

In a frequency-selective fading channel, the frequency response of the channel impulse response may be non-uniform and highly fluctuating across the frequencies. Therefore adaptive modulation may be deployed to take advantage of the frequency diversity across the sub-channels. One desirable goal is to achieve a good trade-off between throughput and error performance by using a different modulation and coding scheme (MCS) for different sub-channels, although another possible goal may be to maximize the net data throughput only, regardless of the resultant error performance.

Typically the metric used to assess a sub-carrier's condition is the local SNR, therefore a fundamental issue in deploying adaptive modulation is to determine what MCS to use according to the metric. For a system with several MCSs available (the MCS may be pre-determined by complexity or other implementation issues, for example), the matter of selecting a MCS may be alternatively viewed as the determination of the metric switching thresholds, i.e. when to switch between different MCSs. In some OFDM literature this is also known as the "bit loading" problem. It is well-known that the channel capacity in a spectrally-shaped Gaussian channel may be achieved by a water-filling distribution (see, for example, R. G. Gallager, "Information Theory and Reliable Communication", John Wiley & Sons, New York 1968, and B. S. Krongold, K. Ramchandran and D. L. Jones, "Computationally Efficient Optimal Power Allocation Algorithms for Multicarrier Communication Systems", IEEE Trans. on Communications, Vol.48, No. 1, 2000, pp. 23–27). However, in practice the optimal solution is difficult to achieve, and other sub-optimal solutions are used in the prior art, such as the those based on heuristic methods or analytical techniques, as was discussed above.

Figure 2:
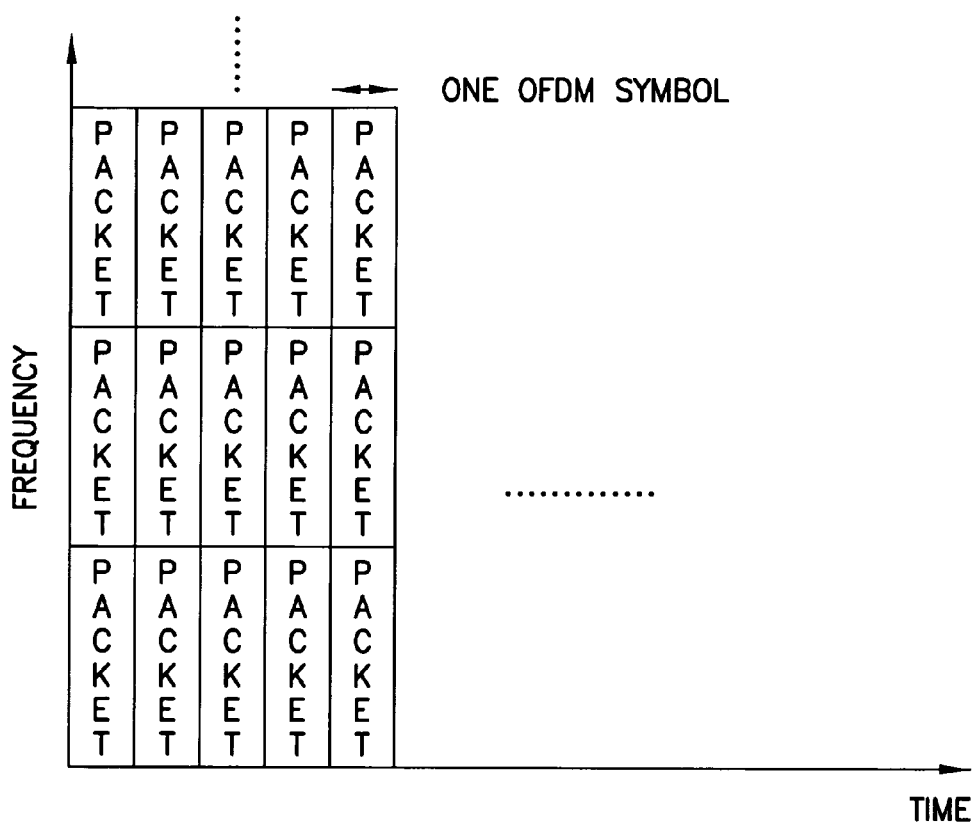
FIG. 2 shows a mode 1 loading, where multiple packets are loaded across the sub-carriers into an OFDM symbol.

With the growing convergence towards an all-IP wireless network, many OFDM systems are packet-data based. For a packet-data based OFDM transceiver, there are at least two possible ways of configuring the sub-carriers to carry the data packets. One way, referred to herein as "mode 1", is to distribute the packets across the sub-carriers. To facilitate the investigation the size of a packet is assumed to be small relative to the number of sub-carriers, so that several packets may be fitted into a single OFDM symbol. The size of the packet, however, is not restricted and large data packets may be conveyed utilizing more than one OFDM symbol. Transmission of a single OFDM symbol thus results in several complete packets being sent at the same time. Interleaving is preferably applied across all of the data symbols conveyed by the OFDM symbol (i.e., across all of the sub-carriers) to ensure that the packets share similar error probabilities, and to thus effectively create a homogenous channel. FIG. 2 shows the mode 1 approach of spreading the packets over frequency.

Figure 3:
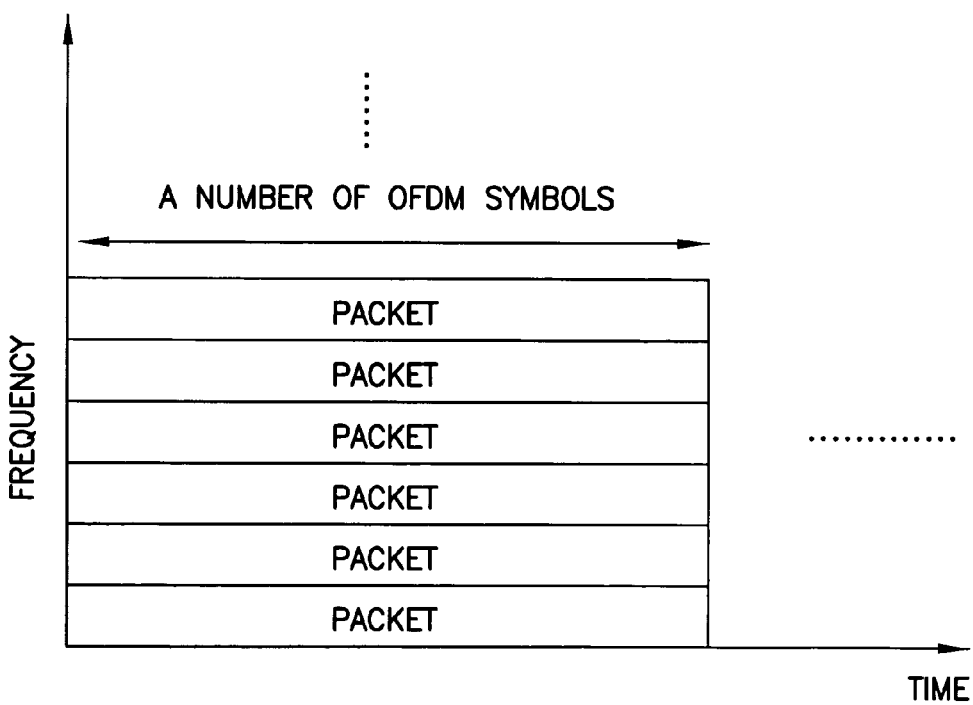
FIG. 3 shows a mode 2 loading, where each sub-carrier is loaded with its own packet, and each packet spreads across a number of OFDM symbols.

Another way of configuring the sub-carriers to carry the data packets, referred to herein as "mode 2", is to load the individual sub-carrier with symbols from separate packets, and to spread the packets across the time domain, i.e., each sub-carrier is dedicated to carrying its own packet. For an OFDM modem with N sub-carriers, symbols from the N packets are thus transmitted simultaneously in a single OFDM symbol. A number of OFDM symbol are required to transmit a full packet in a sub-carrier. If the fade rate is low, or the OFDM symbol duration is short, the channel may be regarded as remaining relatively constant for the entire packet. FIG. 3 illustrates the mode 2 approach of spreading the packets over time.

Adaptive modulation, or bit loading, may be deployed in both modes of operation to improve the error and throughput performance. For the mode 1 configuration the MCS assignment is performed every OFDM symbol. The MCS allocation decides the number of packets that can be accommodated in an OFDM symbol. For the mode 2 configuration the MCS assignment is performed every OFDM frame, which is considered herein to be the number of OFDM symbols required to transmit a complete packet in a sub-carrier with the lowest MCS order. The same MCS is maintained for the entire packet that spreads across an OFDM frame. Note that no rate matching need be performed in either mode, as the goal is to load up the packets according to the sub-channel conditions. If a sub-carrier's SNR is too low it is simply disabled to reduce the average Packet Error Rate (PER). The two modes may be applied to both coded and uncoded packets.

In commonly assigned U.S. patent application Ser. No. 10/629,124, filed Jul. 29, 2003, entitled "Method and Apparatus Providing Adaptive Learning in an Orthogonal Frequency Division Multiplex Communication System" by Tang and Stolpman, an adaptive learning approach was disclosed that adjusts the switching thresholds so as to improve or maximize a chosen performance criterion, for example the throughput, in an OFDM modem. In such a target-orientated method the idea of adaptive control is applied to treat the OFDM transceiver as a controllable system, with the switching thresholds as the control parameters and a performance function (e.g. throughput) as the system output to be maximized. An adaptive scheme block takes the performance function as input and adjusts the switching thresholds to improve or optimize the performance function of the given set of thresholds.

Figure 4:
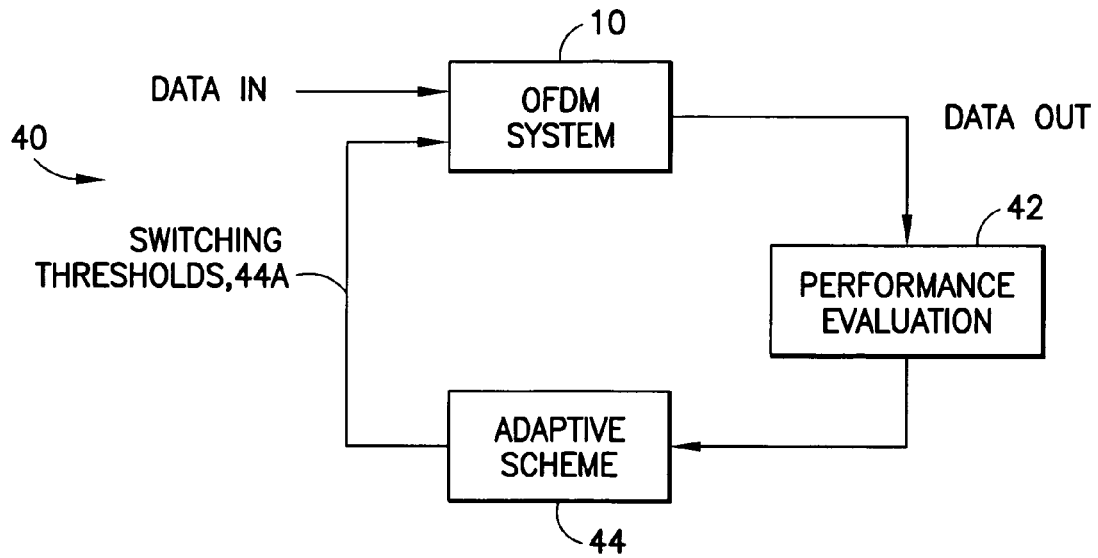
FIG. 4 is a block diagram that illustrates a closed-loop system to adapt the MCS switching thresholds.

A block diagram of the close-looped control concept is shown in FIG. 4, where an OFDM system, such as the system 10 shown in FIG. 1, is coupled with a performance evaluation block 42 that feeds an adaptive scheme block 44. The output of the adaptive scheme block 44 is the MCS switching thresholds 44A that are fed-back to the OFDM system 10. It should be noted that the performance evaluation block 42 may be a part of the OFDM system 10. In FIG. 4 it is illustrated as being external to the OFDM system 10 to emphasize the performance-goal oriented nature of this approach.

The adaptive scheme block 44 implements a method that monitors the performance of the OFDM system 10 and adjusts the MCS switching thresholds 44A accordingly. Because the performance is a function of the channel conditions, which are of a time-varying nature, it is desirable that the adaptive scheme block 44 controls the switching thresholds 44A dynamically to maximize the throughput as the data is transmitted. Furthermore, because of the difficulties in deriving the throughput as an analytical function of the switching thresholds 44A, in a practical situation (e.g., when coding is invoked), it is preferred to use a self-learning method that does not utilize expressions of throughput and the thresholds, and that does not make any assumptions of the operating environment, so that it may more flexibly cope with different channel conditions. The adaptive scheme block 44 preferably implements global optimization in the case where the performance criterion applied by the performance evaluation block 42 is a multi-modal function. Equally important is that the adaptive scheme block 44 be implementable in a mobile transceiver having, typically, limited processing power and memory resources. It is also desirable to not require the use of any dedicated training sequence in order to reduce the signaling overhead and conserve bandwidth. Based on the foregoing, one presently preferred, but not limiting, class of adaptive learning techniques, referred to as a stochastic learning automaton, is presently preferred for use in the invention described in the above noted commonly assigned U.S. patent application Ser. No. 10/629,124.

Basically, the adaptive scheme block 44 monitors the performance of the OFDM system 10 and adjusts the thresholds accordingly. In commonly assigned U.S. patent application Ser. No. 10/629,124 a stochastic learning automaton is disclosed as the adaptive scheme, and the details of how to configure an automaton to adjust the switching thresholds was described. Briefly, the switching thresholds are mapped into the output actions of the automaton, with a one-to-one unique mapping. The automaton learns about the operating environment via trials. At each trial, the automaton selects an action based on an internal probability vector. For mode 1, the learning process includes sending an OFDM symbol, evaluating the average resultant throughput as the outcome and using this value to update the internal probability vector. Assuming an OFDM symbol conveys more than one data packet, the update may either be performed on a per OFDM symbol or a per data packet basis. The former is referred herein as a basic update scheme and the latter as an enhanced update scheme. For mode 2, the transmission of an OFDM frame constitutes a learning cycle, and the automaton is updated either on a per OFDM frame or on a per packet basis. Again, these are referred as basic and enhanced update schemes. Despite the fact that the performance function (e.g., average throughput) may have a higher variance if it is estimated per packet instead of per OFDM symbol (or frame), simulation results showed that the enhanced scheme often offers a faster convergence speed since the automaton is updated multiple times per OFDM symbol (or frame).

This invention extends the teachings of the commonly assigned U.S. patent application Ser. No. 10/629,124 and discloses the use of a decentralized learning control strategy for adaptive OFDM. The presently preferred decentralized scheme for switching threshold adjustment uses a plurality of independent controllers, one controller for each threshold, configured in a co-operative game mode. As is shown in FIG. 5, the co-operative game is considered to have at least two players (controllers) 50 that share a common goal, and results in an outcome that depends on the behavior of the players (see, for example, K. S. Narendra and M. A. L. Thathachar, "Learning automata—an introduction", Prentice Hall, Englewood Cliffs, N.J., 1989). The co-operative game can be played either as a single stage decision problem or repeatedly as a sequential decision problem. In the presently preferred embodiment the controllers 50A, 50B are regarded as players of a sequential game with the operating environment 52, considered herein to be a random environment.

A presently preferred game configuration includes a co-operative team of N-automata, each running a linear reward-inaction (LRI) or linear reward-penalty (LRP) learning algorithm, playing a sequential game with the environment 52 that returns a common pay-off to the entire team of automata (see, for example, K. S. Narendra and M. A. L. Thathachar, "Learning automata—an introduction", Prentice Hall, Englewood Cliffs, N.J., 1989). In accordance with an aspect of the invention, for the optimization of N-switching thresholds, one automaton is dedicated to the control of one threshold. At each play of the game each automaton chooses its action independently, producing a unique set of combinations of the N-threshold values. The environment 52 (the OFDM system in the presently preferred embodiment) evaluates this choice of threshold combinations and returns an identical pay-off to all the automata. Based on this common evaluation each automaton acquires information of, or learns about, the environment using its own learning algorithm and comparison process (see, for example, I. J. Shapiro and K. S. Narendra, "Use of Stochastic Automata for Parameter Self-optimization with Multimodal Performance Criteria", IEEE Trans. on Systems, Man and Cybernetics, Vol. 5, No. 4, 1969, pp. 352–360). The task of the group of N-automata is to choose a combination of N-thresholds, via playing the sequential game with the environment in a co-operative manner, that maximizes the performance function. As the environment changes (e.g. the channel condition varies), the performance function is continuously monitored by means of the sequential game and the switching thresholds dynamically updated to cope with the changes.

As was noted earlier, at each play of the game each player (controller 50A, 50B) chooses an action from a set of actions based on its own strategy and feeds it to the environment 52. In response to this combination of actions, the environment 52 returns to the players a common pay-off (outcome), which is treated as a performance measure to direct the learning process. The learned information is considered as an experience of the player, and the experience is used to improve the quality of control whenever similar situations occur. At each play a player is only aware of its own strategy, its own chosen action, and the outcome that results, and does not have any information about the other players, including their number of actions, the action chosen by them, and the responses they receive after each possible play. In practice, a given controller 50 does not even know the number of players involved, the strategies available to other players and the pay-off function. At each stage each player is only aware of the strategy it has chosen and the corresponding random response (pay-off) of the environment 52. Based solely on this information it decides on the strategy for the next play. Therefore the players (controllers 50) operate completely separate and independent from one another, but share the same objective of maximizing the expected common outcome. By suitably mapping the desired performance function as the outcome, and choosing an appropriate learning controller, it is possible to carry out multiple switching threshold optimization for the adaptive OFDM system operating in a random and unknown environment, for example in the presence of fading channels.

One presently preferred, but not limiting, class of adaptive learning techniques, referred to as a stochastic learning automaton, is used as the learning controller 50. The ability of learning automata to perform parameter optimization has been well demonstrated, even in multi-modal performance criteria systems where gradient-based methods fail to realize the global extremum. A learning automaton possesses the powerful capability to gain sufficient knowledge of a process, especially under noisy conditions where no or little a priori information is available, by on-line observation only. The learning automaton learns from past observations and extracts information to improve the quality of control whenever similar control situations occur again. In the presently preferred embodiment of a communication system this feature translates into the elimination of training sequences, thus reducing the signaling overhead and conserving the link bandwidth.

However, it should be appreciated that other types of learning techniques may be used to implement the learning controller, and that the presently preferred stochastic learning automaton is but one suitable, and non-limiting, embodiment.

In accordance with an aspect of this invention, for the optimization of N-switching thresholds there is employed a group of N-automata, one automaton for one controller 50, and one controller 50 for one threshold. Each of the N-thresholds is preferably partitioned (discretized) into a number of regions, with one region mapping into one output action of an automaton. For the group of N-automata, and M-actions, a total of $M^N$ combinations of threshold values are thus possible. The automata may have a different number of actions among them, i.e., the N-thresholds do not need to be uniformly partitioned. At each play of the co-operative game each automaton chooses its action independently, producing a unique set of combinations of the N-threshold values. The environment 52 evaluates this combination of threshold values via the performance function, and returns an identical pay-off to all of the automata. Based only on the pay-off each automaton updates its internal probability vector, which governs the selection of action in the next play, with its own learning scheme. The task of the group of N-automata is to choose a combination of thresholds, via playing the sequential game, that maximizes the performance function. Each OFDM symbol or frame transmitted is regarded as one play of the game. As was noted above, the group of automata operates in a truly decentralized manner, and at any time an automaton is only aware of its learning strategy, its action chosen and the outcome resulted. It does not have any information about the other automata. As the data transmission continues, the game is played repeatedly, the performance function is continuously monitored and the switching thresholds dynamically updated by the group of automata (implemented using the controllers 50). It can be shown that by choosing the proper learning schemes of all the automata, the expected gain increases monotonically at every stage, resulting in the convergence to the best combination of actions. In other words, convergence to the combination of threshold values that maximizes or optimizes the performance function can be achieved.

In deploying such a decentralized approach to adaptive OFDM, where 'decentralized' means that the thresholds are adjusted by-separate and independent controllers 50, the sub-carrier loading modes 1 and 2, and automaton basic and enhanced update schemes, as defined in the commonly assigned U.S. patent application Ser. No. 10/629,124, can be retained.

One difference between the technique of this invention and that described in the commonly assigned U.S. patent application Ser. No. 10/629,124 resides in the adaptive scheme 44 (FIG. 4). In accordance with this invention a team or group of automata are configured in a co-operative game mode are utilized, instead of a single automaton, and the learning process involves the sequential game played by the team of automata with the operating environment 52 (such as the fading channel) to maximize the expected common outcome. The average throughput is chosen as the performance function, although the teachings of this invention are not limited to only this one performance function.

Figure 19:
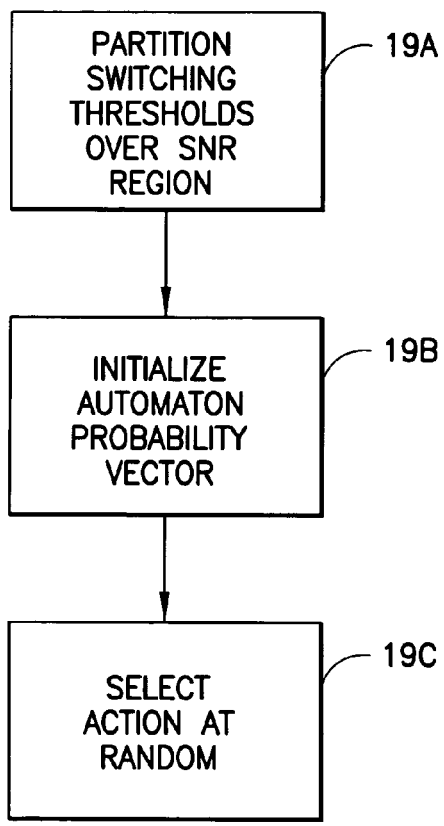
FIG. 19 is a logic flow diagram of an initialization procedure for the team of automaton.

The details of the decentralized learning process and now described. Firstly, the system is initialized with the following steps that are common for mode 1 and 2 operation, and for both the basic and the enhanced update schemes. Reference may also be made to FIG. 19.

At block 19A the switching thresholds are partitioned into a pre-defined set of combinations. Preferably the combinations cover the entire operating SNR region with a fine quantization so that the set includes the unknown optimal (or close to optimal) threshold values. However, this approach could result in a large number of combinations and present a difficult control problem. Generally speaking the greater the number of threshold combinations, the higher the resolution but also the longer the convergence time and the larger the computational load. The enhancement in resolution may or may not justify the increased effort, and in practice a compromise is made depending on the operating scenario. To demonstrate the invention it is adequate to divide each threshold into a small number of values, such as two or three values, which results in a set of threshold combinations that covers a reasonable range of SNR. Initial threshold values may be obtained from the "target BER approach", or by other means, and then intuitively adjusted to create a set of combinations.

At block 19B, and for each automaton 50 in the group, initialize the internal probability vector so that the probability of choosing the actions are the same. This insures that each action have an equal chance of being selected initially. Each action is mapped to a unique threshold value, and the mapping remains the same for the entire learning process.

At block 19C, and based on the internal probability vectors, each automaton 50 chooses an action at random. This gives the initial value for each threshold. The chosen action is then applied to the OFDM system 10.

Figure 20:
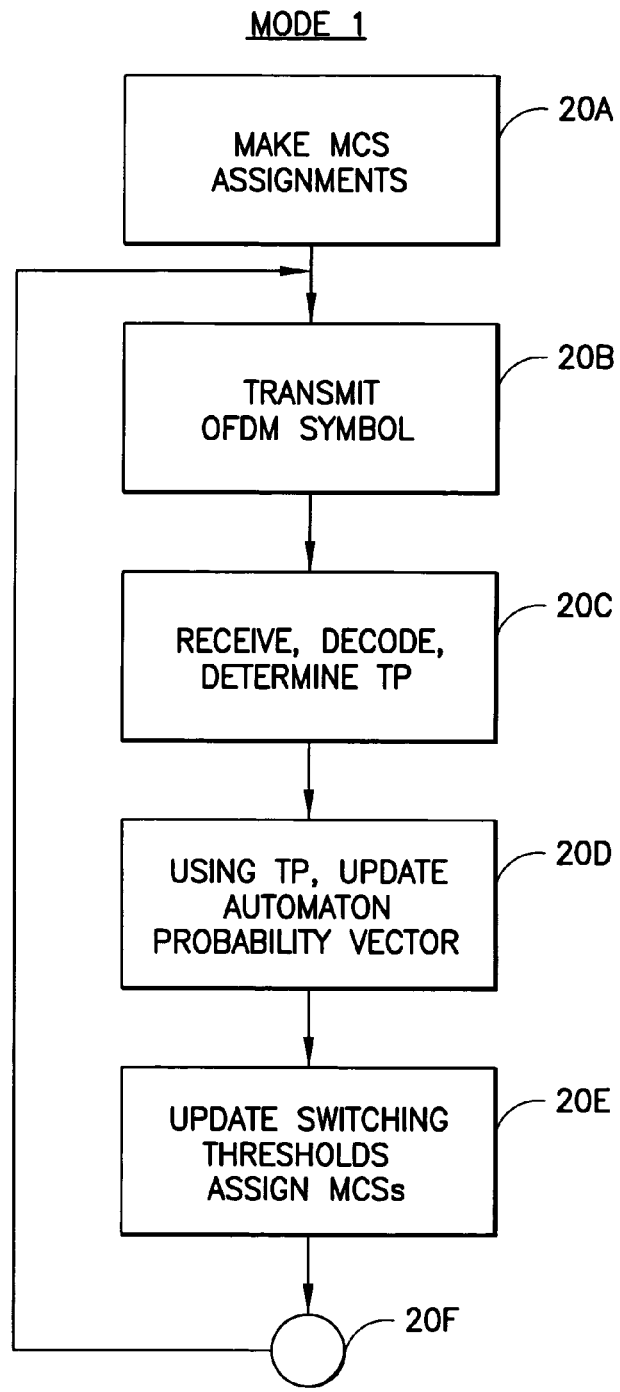
FIG. 20 is a logic flow diagram that illustrates a method of operating the team of automaton, in mode 1 operation.

For mode 1 operation, the following operations are next performed, as shown in FIG. 20.

At block 20A, and based on the chosen threshold values, the OFDM system 10 decides what MCS to use in each of the sub-carriers. The MCS assignment determines how many packets an OFDM symbol can carry (or no packets may be assigned at all if the sub-channel conditions are very poor). The number of packets is preferably an integer. The sub-carriers are then loaded up with the interleaved packets.

At block 20B an OFDM symbol is transmitted, and at block 20C, since the packets are wholly contained within an OFDM symbol, once the OFDM symbol arrives at the receiver 12B all of the packets may be decoded. The performance evaluation block 42 of FIG. 4 performs a CRC check, or some other type of error check, to determine whether there are any errors in the received packets, and evaluates the PER and the throughput (TP) resultant from the earlier choice of actions (threshold values). The throughput is defined as TP=(1-PER)*PPS, where PPS=packets-per-symbol (resultant number of packets transmitted per OFDM symbol). For the basic update scheme this is evaluated across all the received packets and sent to the adaptive scheme block 44 as a single performance function. For the enhanced update scheme the TP is evaluated for each received packet and sent to the adaptive scheme block 44 as a set of performance functions. If there are n packets received in an OFDM symbol, the set of performance functions contains n elements.

At block 20D the throughput information received is treated as the common outcome for the team of automata within the adaptive scheme block 44. For each automaton 50 the internal probability vector is updated, based on the outcome, using a comparison scheme incorporating, in a preferred embodiment, a linear reward-inaction (LRI) or linear reward-penalty (LRP) algorithm (see, for example, K. S. Narendra and M. A. L. Thathachar, "Learning automata—an introduction", Prentice Hall, Englewood Cliffs, N.J., 1989; and I. J. Shapiro and K. S. Narendra, "Use of Stochastic Automata for Parameter Self-optimization with Multimodal Performance Criteria", IEEE Trans. on Systems, Man and Cybernetics, Vol. 5, No. 4, 1969, pp. 352–360.) If the selected action is found to yield a good performance its selection probability is increased, and vice versa. For the basic update scheme, this update procedure is performed only once per received OFDM symbol. For the enhanced update scheme, it is performed once for each packet received. Therefore if there are n packets received in an OFDM symbol, the team of automata represented by the adaptive scheme 44 are updated n times.

At block 20E, and for each automaton 50 in the group, an action is chosen at random using the updated automaton probability vector, and the updated thresholds are sent to the OFDM system 10. At the next OFDM symbol, appropriate MCS are assigned to the sub-carriers according to the updated thresholds and an integer number of new packets are loaded. Control then passes back to block 20B to transmit the next OFDM symbol, and the data transmission and learning process continue.

Figure 21:
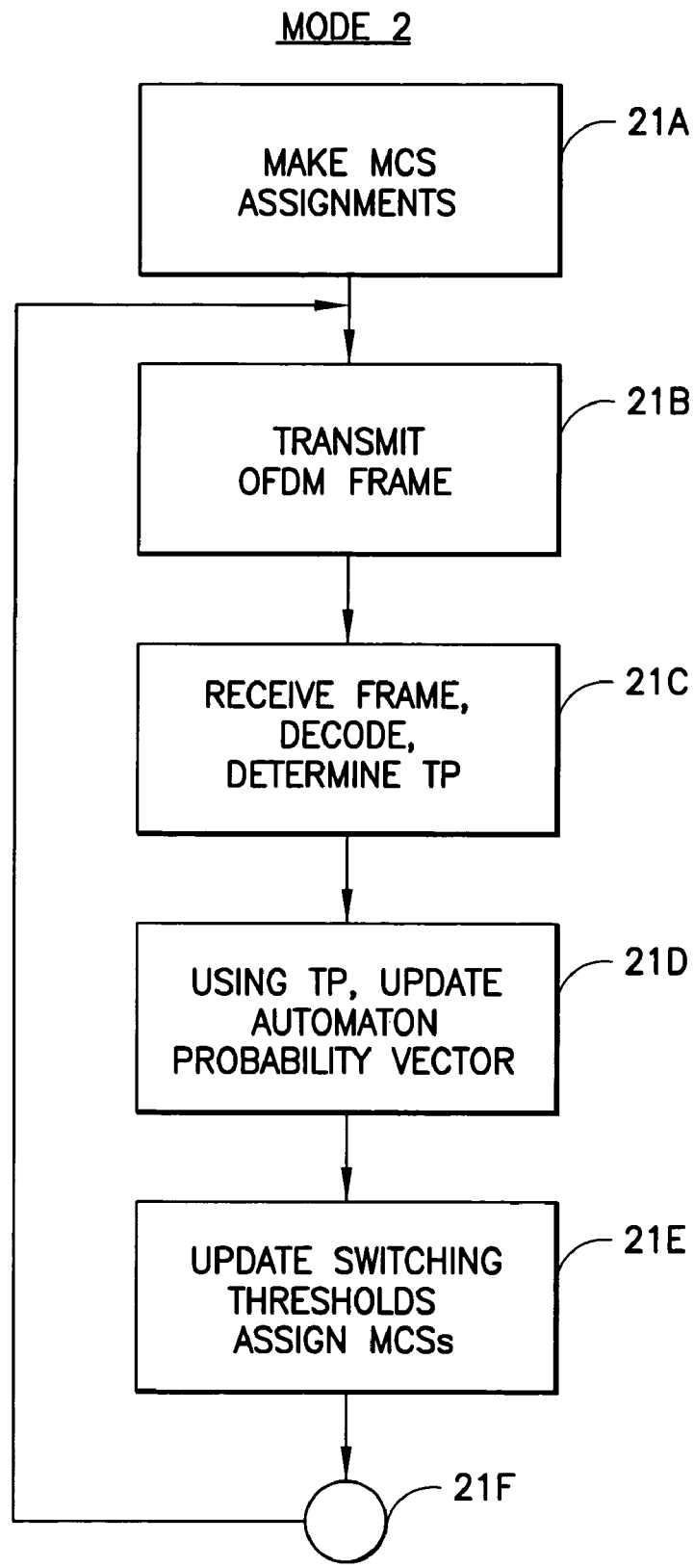
FIG. 21 is a logic flow diagram that illustrates a method of operating the team of automaton, in mode 2 operation.

For mode 2 operation the following procedures are used, as shown in FIG. 21.

At block 21A, and based on the selected threshold values, the OFDM system block 10 determines what MCS to use in each of the sub-carriers. Each sub-carrier is loaded with a symbol from its own assigned packet (or no packets may be assigned at all if the sub-channel conditions are very poor). Once a MCS is imposed on a sub-carrier this also determines how long (i.e. how many OFDM symbols) is required to transmit a packet in that sub-carrier, as the MCS is not altered within a packet.

At block 21B a frame of OFDM symbols is sent by the transmitter 12A, and at block 21C, since the frame length is dictated by the lowest MCS order available and is fixed, those sub-carriers with a higher order MCS will carry more than one packet in a frame of OFDM symbols. When an entire frame of packets is received by the receiver 12B, the performance evaluation block 42 performs a CRC check or some other type of error check to find out whether the received packets are in error, and evaluates the PER and TP resultant from the earlier choice of actions (threshold values) for those packets in the active SNR regions only. Here the active regions are defined as the SNR range covered by the available switching threshold values. In this case the throughput is defined as TP=(1-PER)*PPF, where PPF=packets-per-frame (resultant number of packets transmitted per OFDM frame). For the basic update approach the TP is evaluated across all of the received active packets and sent to the adaptive scheme block 44 as a single performance function. For the enhanced update approach the TP is evaluated for each received active packet and is sent to the adaptive scheme block 44 as a set of performance functions. If there are n active packets received in an OFDM frame, the set of performance functions contains n elements.

At block 21D the throughput (TP) information received is treated as the common outcome for the team of automata 50 contained within the adaptive scheme block 44. For each automaton 50 the internal probability vector is updated, based on the outcome, using a comparison scheme incorporating, preferably but not by way of limitation, the LRI or LRP algorithm. If the selected action yields a good performance its selection probability is increased, and vice versa. For the basic update scheme, this update procedure is performed for each automaton 50 in the team once per OFDM frame received. For the enhanced update scheme, the procedure is performed differently, only the automaton 50 controlling the active region from which the active packet originated is updated with the TP evaluated from that active packet. Therefore if there are n active packets received in an OFDM frame, there will be n individual automaton updates.

At block 21E, and for each automaton 50 in the team, an action is chosen at random using the updated automaton probability vector, and the updated thresholds are sent to the OFDM system 10 (to the random environment 52). At the first OFDM symbol of the next frame, appropriate MCSs are assigned to the sub-carriers and data symbols from the new frame of packets loaded. Control then passes back to block 21B to transmit the next OFDM frame.

As was described above, the adaptive scheme block 44 operates differently in mode 1 and 2 because of the different ways the packets are loaded onto the sub-carriers. In mode 1, the switching thresholds are selected by the team of automata 50 once per OFMD symbol, but the team of automata 50 is updated either once per OFDM symbol (basic update scheme) or once per received packet (enhanced update scheme). Since there are multiple packets per OFDM symbol the update occurs multiple times per OFDM symbol in the enhanced scheme. In mode 2, the switching thresholds are selected by the team of automata 50 once per OFDM frame (which may contain tens or hundreds of OFDM symbols), but the team of automata 50 is updated either once per OFDM frame (basic scheme) or once per received packet (enhanced scheme). Since there are multiple packets per OFDM frame the update occurs multiple times per OFDM frame in the enhanced scheme.

Figure 6:
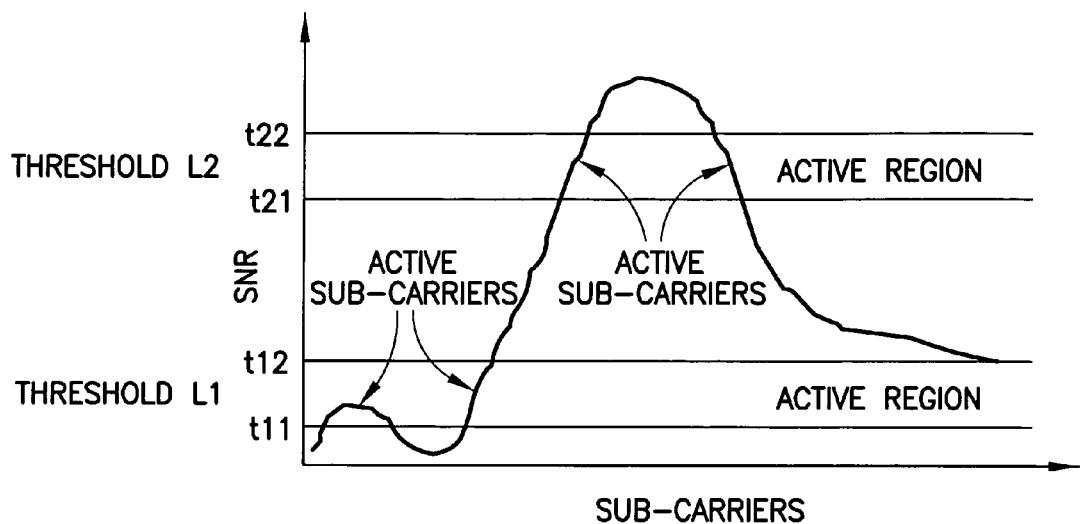
FIG. 6 is a graph showing candidate thresholds and the resulting active regions in mode 2.

The concept of the active SNR region is used in mode 2 only, as in mode 1 any changes in the switching threshold values will affect all of the packets carried by the OFDM symbol. This is because the data symbols from all of the packets are interleaved across the sub-carriers. However, in mode 2 the situation is different, as each sub-carrier is loaded with its own packet that spreads out in time across a number of OFDM symbols. Interleaving, if desired, is performed within a packet only. Hence a change in threshold value only affects the MCS allocation of a limited number, and not all, of the sub-carriers. This is illustrated in FIG. 6, where an example of the sub-carrier SNR is plotted. Two threshold levels are shown: threshold L1 determines the SNR level to switch from no transmission to MCS1, and threshold L2 determines the switching from MCS1 to MCS2. Each of the two thresholds has two values: t11 and t12, and t21 and t22, respectively. It can be readily seen that changing L1 from t11 to t12 only affects the sub-carriers with SNRs between t11 & t12. That is, by changing the value of L1 from t11 to t12, only the sub-carriers in the corresponding active region transition from MCS1 to no transmission, and the MCS allocations of the other sub-carriers are unaffected by this change. A similar situation applies to L2. Only sub-carriers in the active regions affect the TP performance when the thresholds are adjusted. Therefore only the packets carried by the sub-carriers in these regions, referred to as active packets, are employed in the automata update process in mode 2. Furthermore in the enhanced update scheme, only the automaton 50 controlling the active region from which the active packet originated is updated with the TP evaluated from that active packet. For example, the automaton 50 that controls threshold L1 is only updated with the packets carried by the sub-carriers whose SNRs are located at the active region bounded by t11 & t12.

Reference is made to FIG. 7 for a discussion of the decentralized learning control scheme. FIG. 7 shows a block diagram of a simulation system 60 that includes a random data source 62, a convolutional encoder and interleaver 64, an adaptive OFDM modulator 66, a two path Rayleigh fading channel model 68, a coherent OFDM demodulator 70, a de-interleaver and soft Viterbi decoder 72, and packet data checker and data output module 74 and, in accordance with this invention, an adaptive OFDM modulation controller 76 receiving inputs from the channel model 68 and from the data output module 74. In the simulation system 60 there are implemented a total of 2048 sub-carriers within an OFDM symbol giving 2048 time samples, to which 202 cyclic prefix samples are added. A time-domain OFDM symbol thus contains a total of 2250 data samples. The sampling frequency is chosen to be 100 MHz, a sub-carrier has a 48.828 KHz bandwidth, and an OFDM symbol occupies 22.5 usec. The channel coder 64 is a ½ rate convolution encoder from the IEEE 802.11a standard (IEEE 802.11a standard, "Part 11: Wireless LAN MAC and PHY specifications: High Speed Physical Layer in the 5 GHz Band", September 1999). It is assumed that two modulation schemes are available, QPSK and 8 PSK, with coherent demodulation. A packet of data contains 96 data bits (including CRC) and six flush bits, thus a packet of encoded symbols contains 204 real symbols or 102 complex symbols. For mode 1 a packet thus requires 102 sub-carriers if QPSK is used, and 68 sub-carriers if 8 PSK is used instead. An OFDM symbol of 2048 sub-carriers therefore accommodates a maximum of 20 packets if QPSK is used, or 30 packets if 8 PSK is used, or a mixture of them (leaving eight sub-carriers unused). For the mode 2 configuration an encoded packet has a duration of 102 OFDM symbols if QPSK is used, or 68 symbols if 8 PSK is employed instead. Thus a frame contains 102 OFDM symbols, during which one packet is transmitted by a QPSK sub-carrier, and 1.5 packets are conveyed by an 8 PSK sub-carrier.

In general for an adaptive modulation system with K MCSs, there are K thresholds to be compared. In the present example with two modulation schemes there are two thresholds (L1 & L2) to be compared against. The first threshold L1 determines when to switch from the no transmission mode to the QPSK mode (when the sub-channel is "bad"), and the second threshold L2 determines when to switch from the QPSK mode to the 8 PSK mode (when the sub-channel is "good" enough to warrant switching up to the next higher order modulation). Any sub-channels with an instantaneous SNR below L1 are disabled and not used for transmission, while those between L1 and L2 are transmitted with QPSK modulation, and those above L2 are transmitted through using 8 PSK modulation.

To facilitate the simulations the following assumptions are made. A first assumption is that perfect channel knowledge is available so that the channel frequency function is always accurately known. In reality, the channel may be estimated via pilot tones or symbols. Channel prediction or tracking techniques may then be used to obtain the channel values between the pilots if necessary. A second assumption is that the modulation scheme selection in the transmitter 12A is reliably passed on to the receiver 12B. In practice this may imply that an additional signaling channel is available between the transmitter 12A and receiver 12B, or that some type of blind detection technique be used at the receiver 12B. A third assumption is that throughput information evaluated at the receiver 12B is available to the transmitter 12A so that the adaptive scheme block 44 can be updated. Alternatively, packet error information may be sent to the transmitter 12A and the throughput calculated there, or the adaptive scheme block 44 may be implemented at the receiver 12B and the determined switching threshold values 44A sent to the transmitter 12A. Again, this may imply the presence of a signaling channel to carry such information from the receiver 12B to the transmitter 12A.

In the process described thus far the desired goal is to solely maximize the throughput, and no rate-matching is considered. Also, the power of the sub-carriers is not adapted. However, in other embodiments of this invention either one or both of rate-matching and sub-carrier power control may also be implemented.

Figure 8:
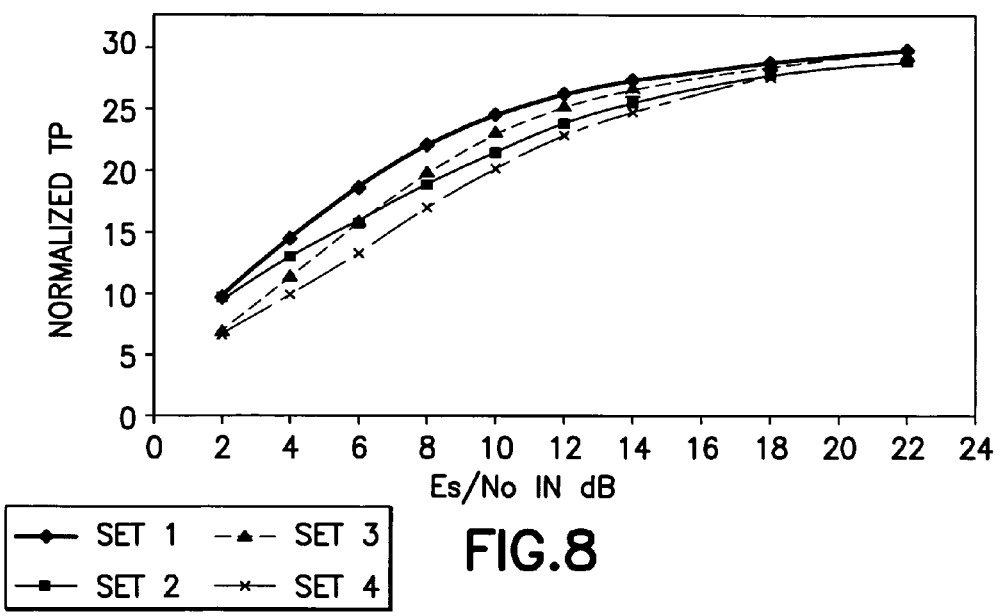
FIG. 8 is a graph showing throughput curves for adaptive modulation with four switching threshold sets, mode 1.
Figure 9:
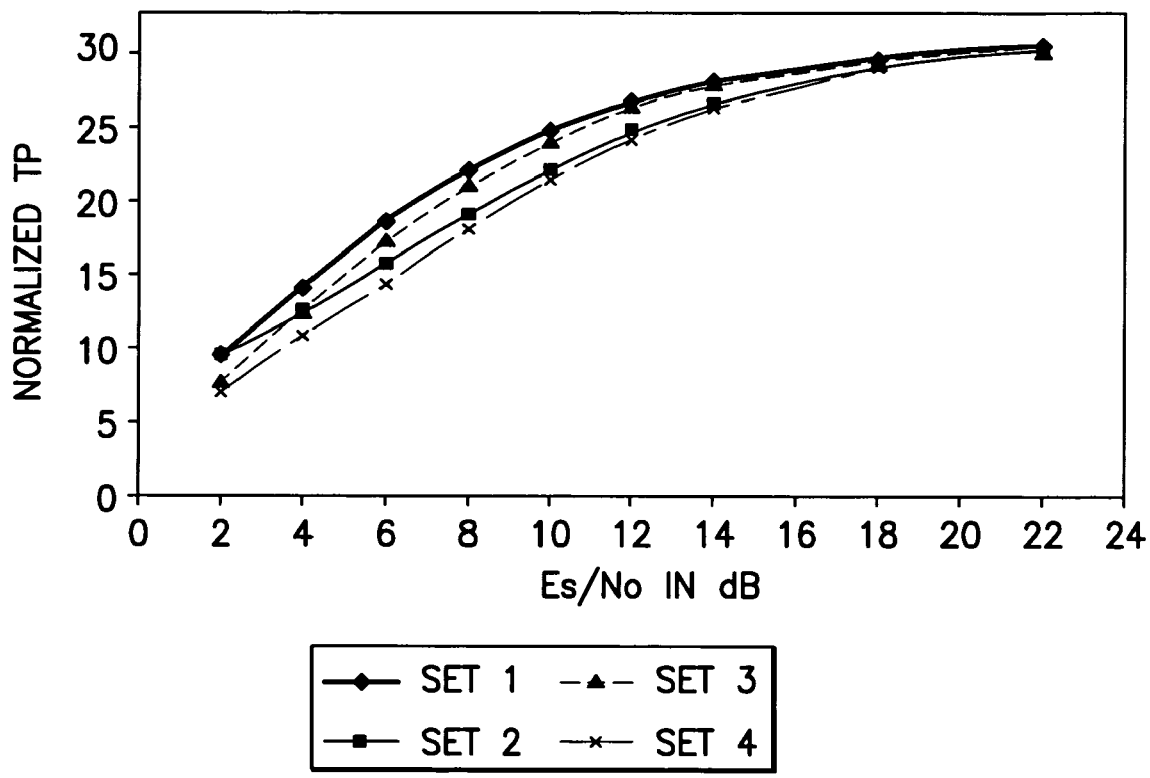
FIG. 9 is a graph showing throughput curves for adaptive modulation with the four switching threshold sets, mode 2.

Each threshold is partitioned into two values resulting in four sets of threshold combinations. The Table shown in FIG. 18 lists exemplary threshold values for L1 and L2. Each threshold combination produces a different TP performance. FIGS. 8 and 9 depict the TP curves for mode 1 and 2, respectively. The channel model is a two-path Rayleigh fading with a Doppler frequency of 20 Hz. In this particular test scenario the optimum threshold combination that produces the highest throughput happens to be set 1 across all the SNRs for both modes. However, for high SNRs, the TP produced by set 1 and set 3 are very close, especially for mode 2 where the loss is merely 1.67% for a SNR of 12 dB and 0.24% for 22 dB (if set 3 is selected instead of set 1). This is as expected, as the two sets of thresholds only differ in L1, which has little or no effect at high SNRs. Hence for high SNRs, either set of thresholds would be an appropriate choice among the four sets available.

Figure 10:
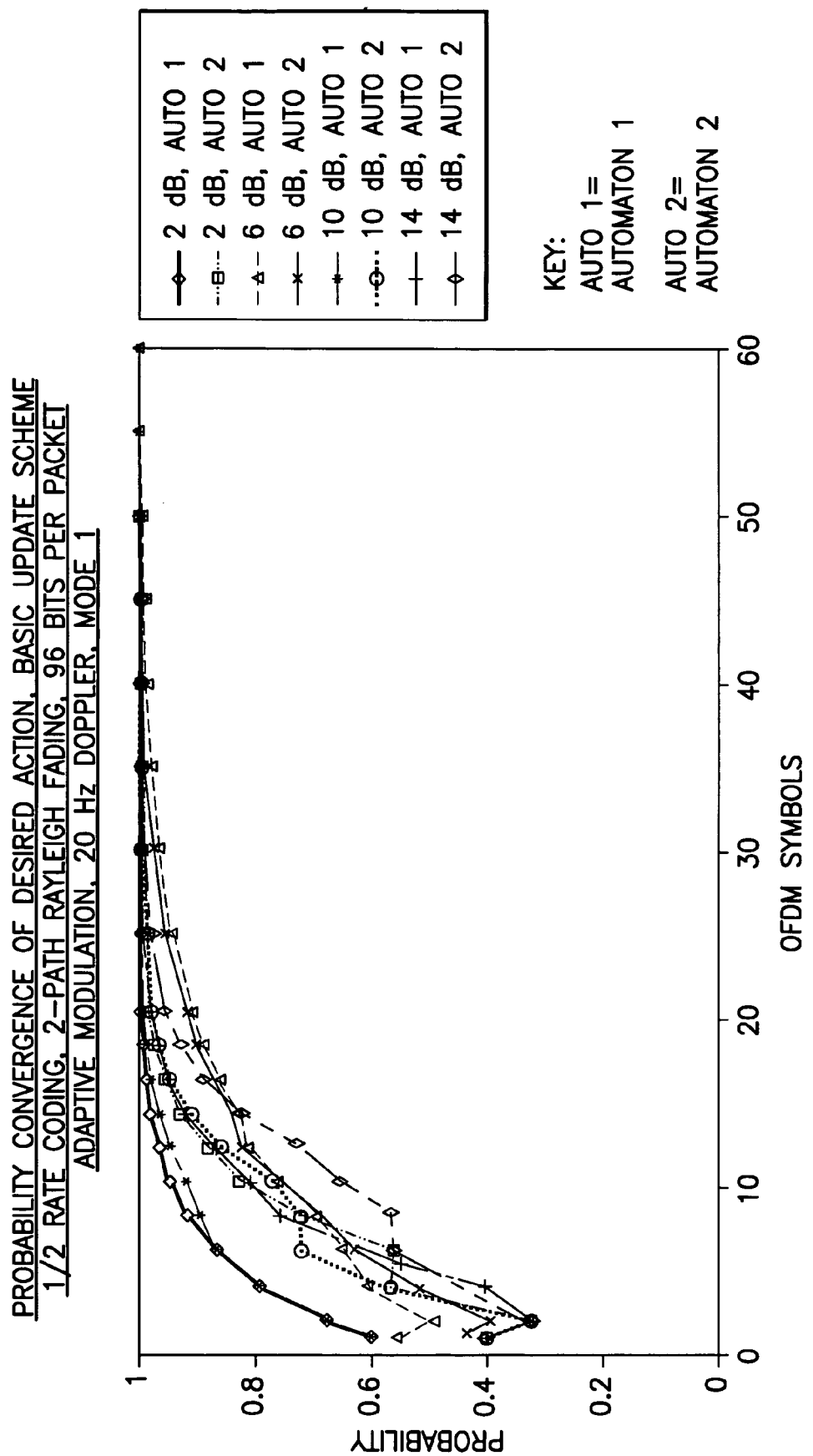
FIG. 10 is a graph showing a probability convergence curve of the desired action, basic update scheme, mode 1.
Figure 11:
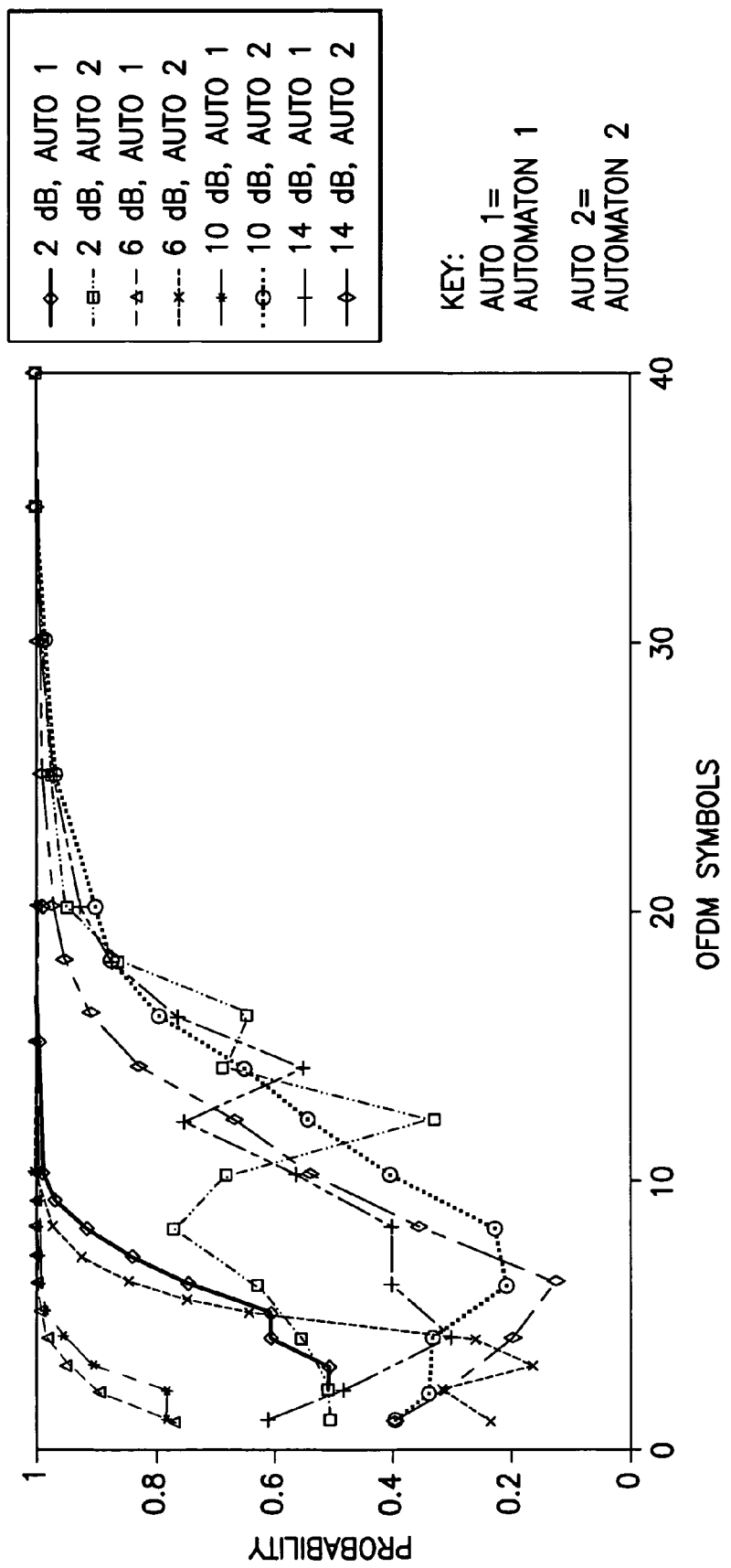
FIG. 11 is a graph showing a probability convergence curve of the desired action, enhanced update scheme, mode 1.
Figure 12:
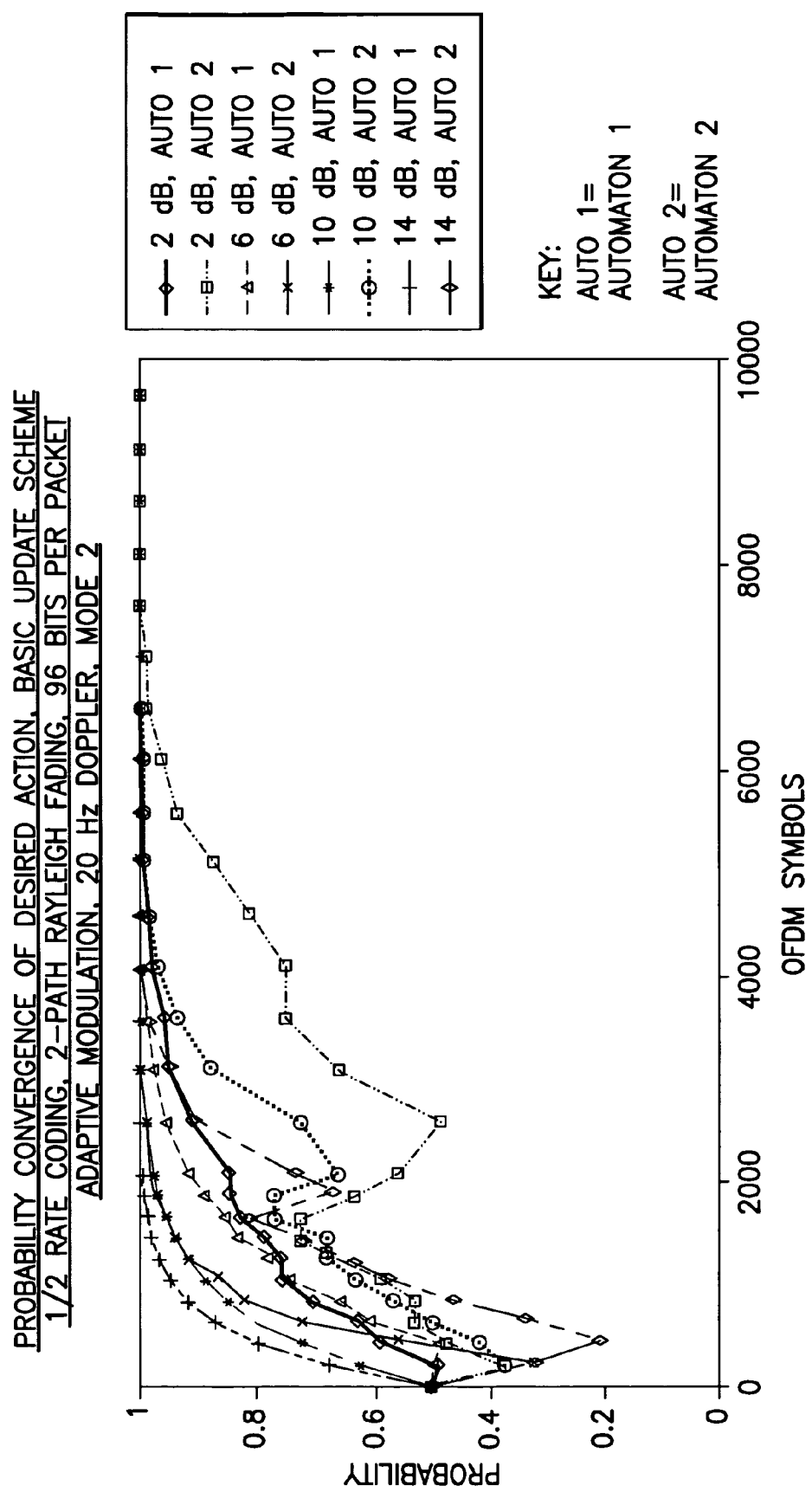
FIG. 12 is a graph showing a probability convergence curve of the desired action, basic update scheme, mode 2.
Figure 13:
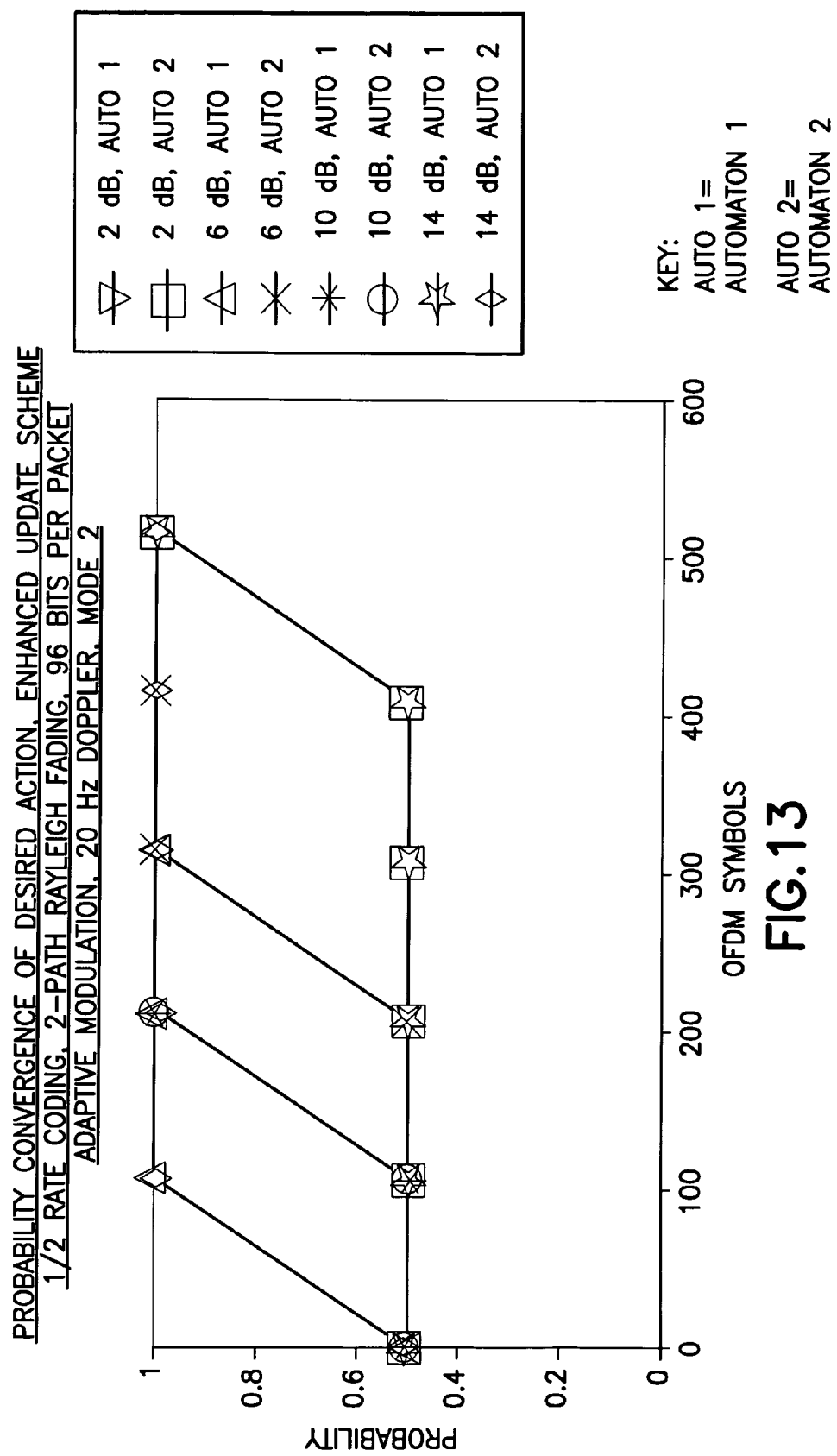
FIG. 13 is a graph showing a probability convergence curve of the desired action, enhanced update scheme, mode 2.

The decentralized learning control scheme in accordance with this invention was then applied to select the switching thresholds. A co-operative team of two automata was used, as shown in FIG. 5, with each automaton 50 using the LRI learning algorithm. Each automaton 50 had two actions and controlled one threshold only. Each action of an automaton 50 mapped uniquely into a candidate threshold value, for automaton 1 (Player-1 in FIG. 5) the two actions are mapped into L1=−2 & 2 dB, and for automaton 2 (Player-2 in FIG. 5) the two actions mapped into L2=6 & 10 dB. Simulations were performed under the same channel conditions for both the mode 1 and mode 2 configurations. It was found that each of the two automata 50 converged to the proper action such that the set of two actions together represented the best combination of switching threshold values. The probabilities were updated based entirely on the measured performance criterion. The fading channel model and noise level had no direct effect on the learning process. Only the chosen performance criterion, the averaged TP, determined how the probabilities were altered. After a certain number of trials, the probability for selecting the 'good' actions gradually increased to 1.0, while that for the 'bad' actions decreased to 0.0. FIG. 10 depict the convergence characteristics for picking the 'good' actions (that produce the best throughput) for a SNR of 2, 6, 10 and 14 dB for mode 1 with the basic update scheme. The convergence results for the enhanced update scheme are shown in FIG. 11. The corresponding graphs for mode 2 with the basic and enhanced update schemes are shown in FIGS. 12 and 13, respectively, for the same assumed SNRs. In this mode the results are plotted at frame intervals, i.e. at an interval of 102 OFDM symbols. Since there are often hundreds or more of active packets in a frame, and they cause the automata 50 to be updated multiple times per frame, the probability curves (FIG. 13) may transition abruptly from 0.5 to almost 1 from one frame to another in the enhanced update scheme.

Figure 14:
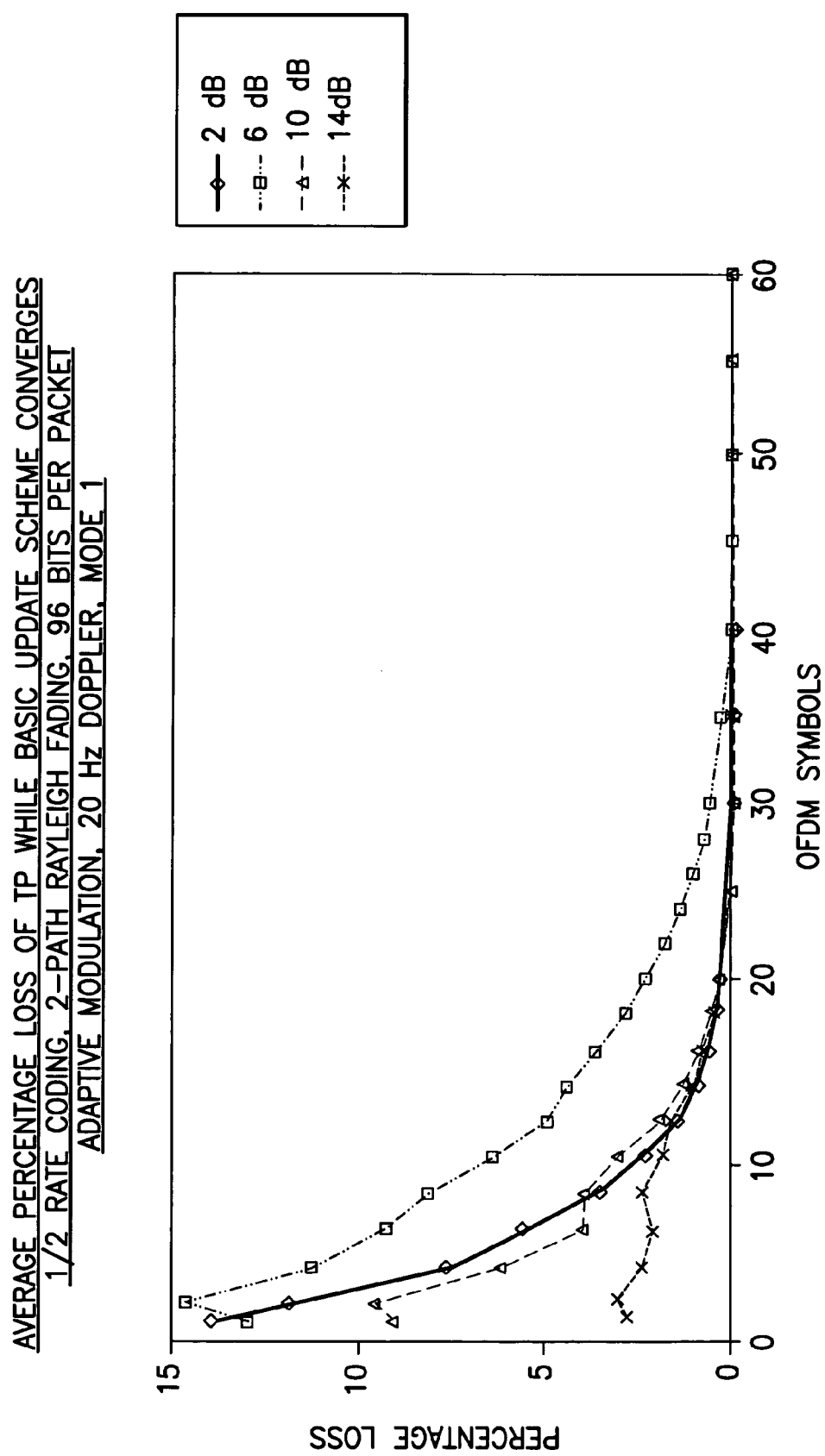
FIG. 14 is a graph showing average loss in TP while the learning scheme converges, basic update scheme, mode 1.
Figure 15:
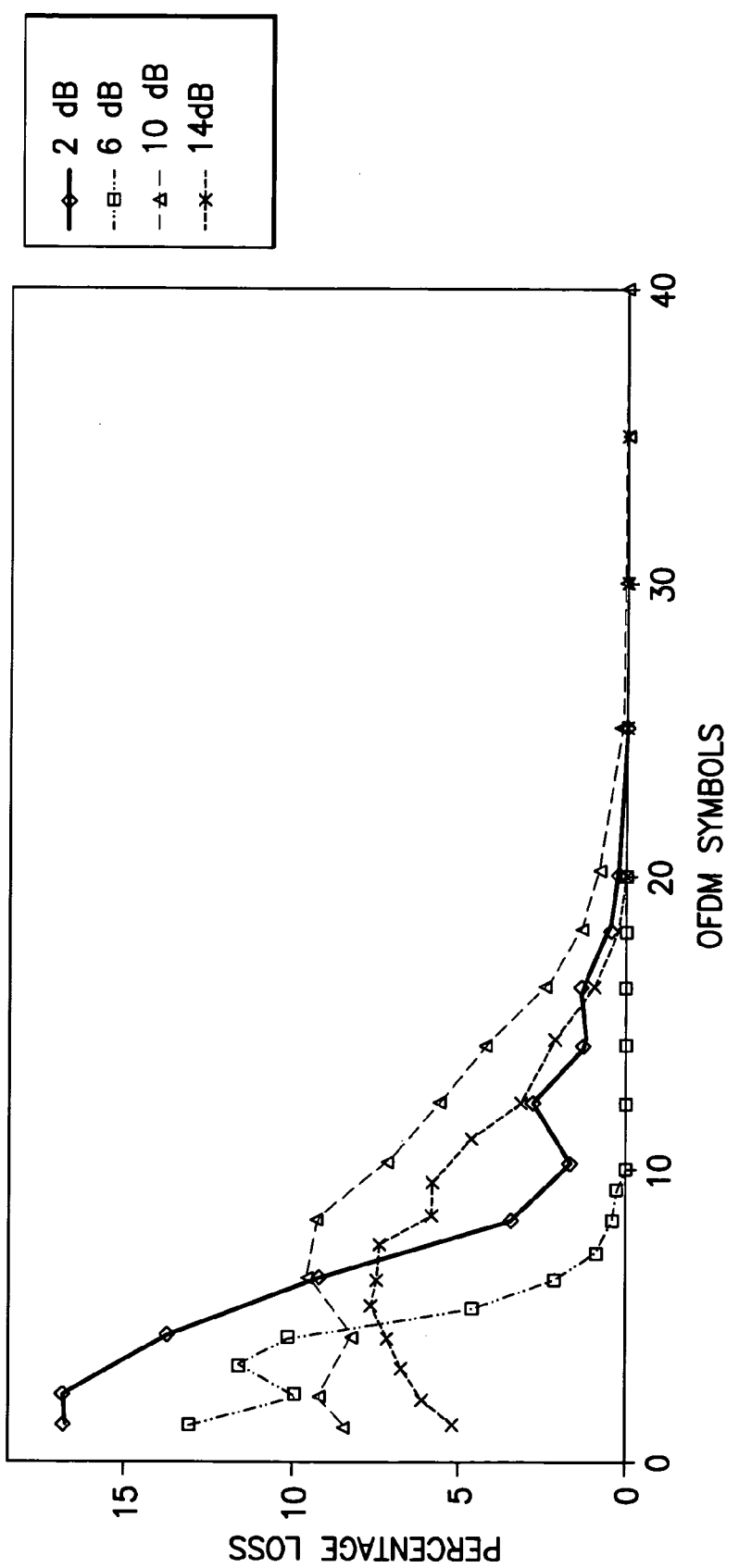
FIG. 15 is a graph showing average loss in TP while learning scheme converges, enhanced update scheme, mode 1.
Figure 16:
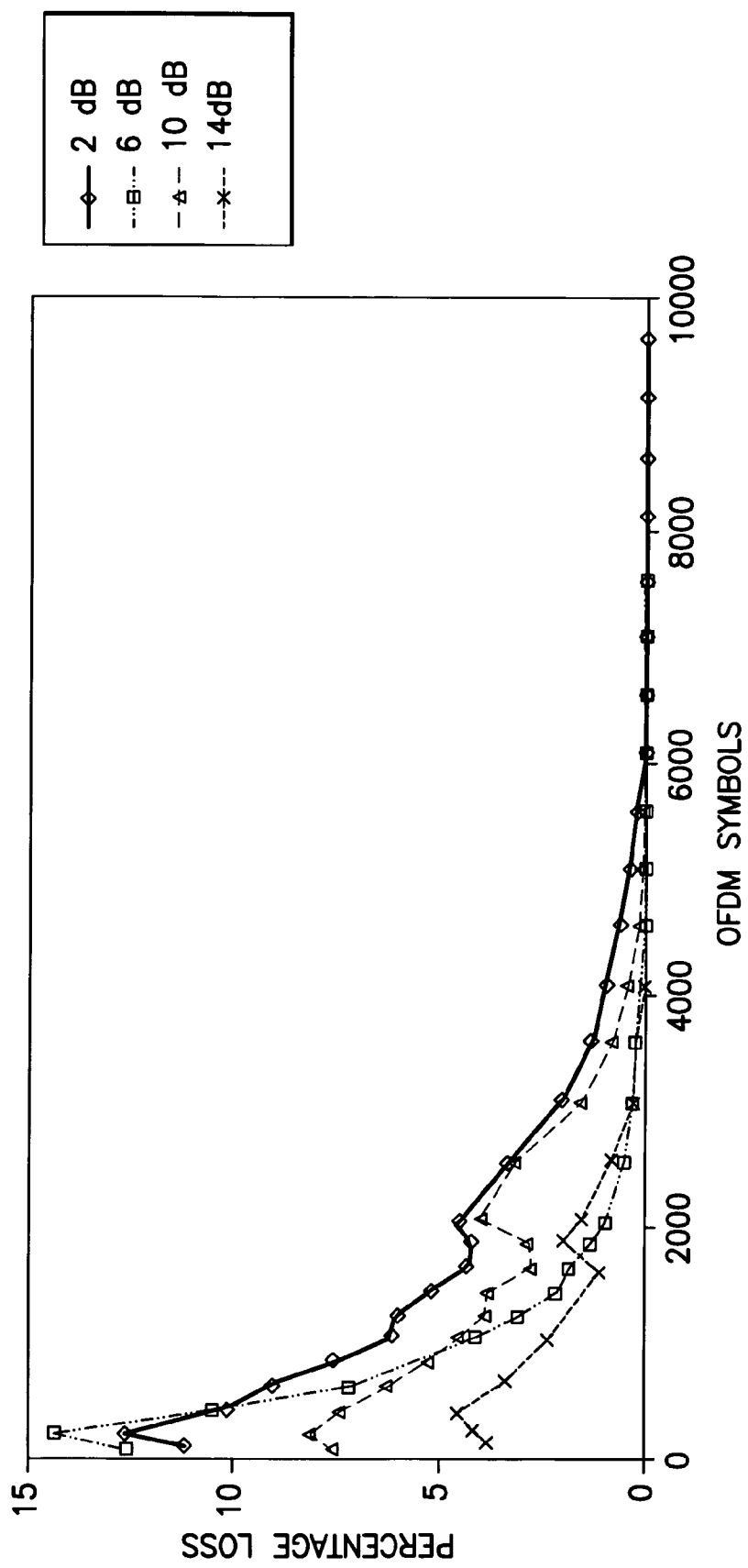
FIG. 16 is a graph showing average loss in TP while learning scheme converges, basic update scheme, mode 2.
Figure 17:
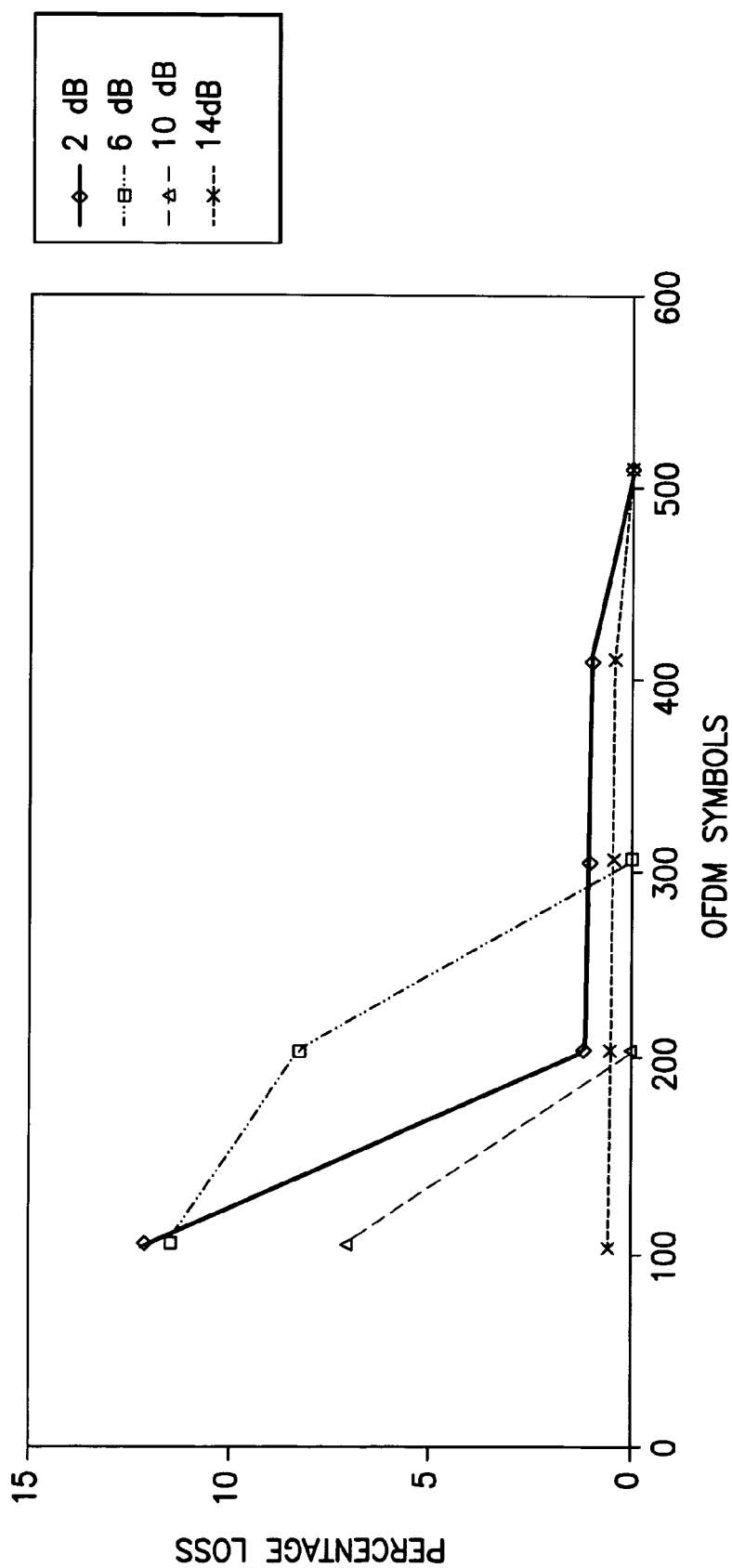
FIG. 17 is a graph showing average loss in TP while learning scheme converges, enhanced update scheme, mode 2.

One further way of assessing the performance of the de-centralized learning scheme in accordance with this invention is to calculate the average percentage loss in TP, defined here as the percentage loss in TP resulted from choosing an action other than the best one while the learning scheme converges. Such graphs are shown in FIGS. 14 and 15 for mode 1 with the basic and enhanced update schemes, respectively, and FIGS. 16 and 17 for mode 2 with the basic and enhanced schemes, respectively.

In most cases the decentralized learning control scheme of this invention offers a faster convergence speed for both mode 1 and 2, as compared to previous approaches as described in the commonly assigned U.S. patent application Ser. No. 10/629,124. This is because each action now starts with a higher initial probability of 0.5, and receives a larger increment at each update. If a single automaton with four actions is used instead, the initial probability of each action begins at a lower value of ¼=0.25, and thus convergence requires more time.

One significant advantage of using a group or team of automata, as opposed to a single automaton, is a reduced computational load and a faster convergence speed. A team of N-automata 50, each having a freedom of taking M-actions, involves only a total of N×M elements as opposed to $M^N$ elements in a single automaton with the same parameter partitioning. Thus, at each trial there are only N×M probability vectors to be updated instead of $M^N$. Each action of the automaton further starts with a probability of 1/M instead of $1/M^N$. Depending on the values of M and N this can imply a substantial savings in computational effort, as well as a large improvement in convergence rate. This aspect of the invention highlights an important feature of decentralized control, i.e., by distributing the load the computation requirement may be greatly reduced, which can be a significant benefit in practical implementations. For systems with a large number of switching thresholds and a fine level of partitioning. (i.e. large M and N), the team of co-operative automata 50 may well be a better choice than a single automaton.

As can be appreciated, this invention provides in one aspect a decentralized game theory based concept to adjust the switching thresholds in an adaptive OFDM modem. Unlike approaches based on heuristic or analytical means, the approach of this invention offers an alternative solution that may be particularly suitable in practical situations when heuristic methods offers limited performance, and when analytical solutions are difficult or virtually impossible to deploy. The improvement in convergence speed and reduction in computational load, while retaining many features and advantages of adaptive learning control, further increases the attractiveness of this performance-goal orientated approach.

The foregoing description has provided by way of exemplary and non-limiting examples a full and informative description of the best methods and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, and as was noted, changes may be made in the numbers of OFDM sub-channels, frequencies, numbers of bits used, types and numbers of modulation schemes, and so forth, by those skilled in the art. However, all such and similar modifications of the teachings of this invention will still fall within the scope of this invention. Further, some of the features of the present invention could be used to advantage without the corresponding use of other features. As such, the foregoing description should be considered as merely illustrative of the principles of the present invention, and not in limitation thereof, as this invention is defined by the claims which follow.

What is claimed is:

1. A method for operating an orthogonal frequency division multiplexing (OFDM) communications system, comprising:
    when transmitting data over a plurality of OFDM sub-channels from an OFDM transmitter to an OFDM receiver through a channel,
    operating a co-operative adaptive learning automaton comprised of a plurality of automata to adjust values of modulation coding scheme (MCS) switching thresholds so as to maximize at least one selected performance criterion;
    based on the values of the switching thresholds, selecting a MCS and modulating data with the selected MCS; and
    transmitting the modulated data over at least some of the sub-channels.

2. A method as in claim 1, further comprising:
    receiving the data at the OFDM receiver; and
    demodulating the received data using a demodulator that corresponds to the selected MCS.

3. A method as in claim 2, where the plurality of automata are located at the OFDM transmitter, and where feedback information that is indicative of the at least one selected performance criterion is signaled from the OFDM receiver to the OFDM transmitter, and where information indicative of the selected MCS is signaled from the OFDM transmitter to the OFDM receiver.

4. A method as in claim 2, where the plurality of automata are located at the OFDM receiver, and where information that is indicative of the selected MCS is signaled from the OFDM receiver to the OFDM transmitter.

5. A method as in claim 1, where the selected performance criterion comprises data throughput.

6. A method as in claim 1, where the OFDM communications system operates by loading a plurality of data packets across the plurality of sub-carriers so that the plurality of data packets are loaded into one OFDM symbol.

7. A method as in claim 1, where the OFDM communications system operates by loading each sub-carrier with a data packet so that each data packet is spread across a plurality of OFDM symbols.

8. A method as in claim 1, further comprising a step of initializing the automata by:
    partitioning the switching thresholds into a pre-defined set of combinations to cover all or substantially all of a range of operating signal-to-noise ratios (SNRs);
    assigning a particular switching threshold to a particular one of the plurality of automata;
    initializing an internal probability vector of each of the plurality of automata such that the probabilities of choosing a particular action are the same;
    mapping each particular action of each of the plurality of automata to a unique switching threshold value; and
    selecting an action at random.

9. A method as in claim 8, where for a mode 1 operation where the OFDM communications system operates by loading a plurality of data packets across the plurality of sub-carriers so that the plurality of data packets are loaded into one OFDM symbol, further comprising:
    based on selected switching threshold values, determining what MCS to use in each of the sub-carriers, thereby determining how many data packets an OFDM symbol can carry;
    loading the sub-carriers with the data packets;
    transmitting the OFDM symbol from the OFDM transmitter;
    receiving the OFDM symbol at the OFDM receiver and determining a packet error rate (PER) to determine data throughput (TP), TP=(1-PER)*PPS, where PPS=packets-per-symbol;
    based on the data throughput, updating the internal probability vector of each automaton such that only if the selected action has resulted in good throughput performance the selection probability of the selected action is increased, thereby updating the switching threshold values;
    in each of the plurality of automata selecting another action at random using the updated automaton internal probability vector; and
    at the next OFDM symbol, assigning MCSs to the sub-carriers according to the updated switching threshold values, loading new data packets to the sub-carriers accordingly, and transmitting the next OFDM symbol.

10. A method as in claim 8, where for a mode 2 operation where the OFDM communications system operates by loading each sub-carrier with a data packet so that each data packet is spread across a plurality of OFDM symbols, further comprising:

based on selected switching threshold values, determining what MCS to use in each of the sub-carriers, and loading each sub-carrier with a symbol from an assigned data packet;

transmitting a frame of OFDM symbols from the OFDM transmitter;

receiving the frame of OFDM symbols at the OFDM receiver and determining a packet error rate (PER) to determine data throughput (TP), TP=(1-PER)*PPF, where PPF=packets-per-frame, or TP=(1-PER)*PPS, where PPS=packets-per-symbol;

based on the data throughput, updating the internal probability vector of each automaton such that only if the selected action has resulted in good throughput performance the selection probability of the selected action is increased, thereby updating the switching threshold values;

in each of the plurality of automata selecting another action at random using the updated automaton internal probability vector; and at the first OFDM symbol of the next frame, assigning MCSs to the sub-carriers according to the updated switching threshold values, loading a new frame of data packets to the sub-carriers accordingly, and transmitting the next frame of OFDM symbols.

11. A method as in claim 9, where loading the sub-channels further comprises disabling a sub-channel and not loading a data packet if the sub-channel condition is poor.

12. A method as in claim 10, where loading the sub-channels further comprises disabling a sub-channel and not loading a data packet if the sub-channel condition is poor.

13. A method as in claim 9, where one automaton learning trial is performed per OFDM symbol.

14. A method as in claim 10, where one automaton learning trial is performed per OFDM frame.

15. A method as in claim 8, where for a mode 1 operation where the OFDM communications system operates by loading a plurality of data packets across the plurality of sub-carriers so that the plurality of data packets are loaded into one OFDM symbol, further comprising:

based on selected switching threshold values, determining what MCS to use in each of the sub-carriers, thereby determining how many data packets an OFDM symbol can carry;

loading the sub-carriers with the data packets;

transmitting the OFDM symbol from the OFDM transmitter;

receiving the OFDM symbol at the OFDM receiver and determining a packet error rate (PER) to determine data throughput (PT) in accordance with:

TP=(1-PER)*PPS, where PPS=packet-per-symbol;

based on the data TP, updating the internal probability vector of each automaton such that only if the selected action has resulted in good throughput performance the selection probability of the selected action is increased, thereby updating the switching threshold values, where the automaton internal probability vector is updated for each packet received in an OFDM symbol;

in each of the plurality of automata selecting another action at random using the updated automaton internal probability vector; and at the next OFDM symbol, assigning MCSs to the sub-carriers according to the updated switching threshold values, loading new data packets to the sub-carriers accordingly, and transmitting the next OFDM symbol.

16. A method as in claim 8, where for a mode 2 operation where the OFDM communications system operates by loading each sub-carrier with a data packet so that each data packet is spread across a plurality of OFDM symbols, further comprising:

based on selected switching threshold values, determining what MCS to use in each of the sub-carriers, and loading each sub-carrier with a symbol from an assigned data packet;

transmitting a frame of OFDM symbols from the OFDM transmitter;

receiving the frame of OFDM symbols at the OFDM receiver and determining a packet error rate (PER) to determine data throughput (TP), where the PER and TP are determined only for those packets (active packets) in an active SNR region defined as a SNR range covered by the available combinations of switching thresholds, and where PER and TP are determined in accordance with:

TP=(1-PER)*PPF, where PPF=packets-per-frame, or
TP=(1-PER)*PPS, where PPS=packets-per-symbol;

based on the data throughput for active packets only, updating the internal probability vectors of selected ones of the plurality of automata such that only if the selected action has resulted in good throughput performance the selection probability of the selected action is increased, thereby updating the switching threshold values, where the automaton internal probability vector is updated for each active packet received in a OFDM frame;

in each of the plurality of automata selecting another action at random using the updated automaton internal probability vector; and at the first OFDM symbol of the next frame, assigning MCSs to the sub-carriers according to the updated switching threshold values, loading a new frame of data packets to the sub-carriers accordingly, and transmitting the next frame of OFDM symbols.

17. An orthogonal frequency division multiplexing (OFDM) communications system, comprising:

an OFDM transmitter for transmitting data over a plurality of OFDM sub-channels, said OFDM transmitter comprising a plurality of modulators of different types;

an OFDM receiver for receiving the data from the plurality of OFDM sub-channels, said OFDM receiver comprising a plurality of corresponding demodulators of the different types; and an adaptive learning automaton comprised of a group of independent, decentralized automata operating in accordance with a game theory-based approach, each of the plurality of a automata being responsible for managing one modulation coding scheme (MCS) switching threshold value so as to maximize at least one selected performance criterion, said OFDM transmitter being responsive to the MCS switching thresholds for selecting an appropriate one or ones of said modulators for modulating the data for various ones of the sub-channels.

18. An OFDM communications system as in claim 17, where said OFDM receiver demodulates the received data using one or more demodulators that correspond to the selected modulators.

19. An OFDM communications system as in claim 18, where the group of automata is located at the OFDM transmitter, and where feedback information that is indicative of the at least one selected performance criterion is signaled from the OFDM receiver to the OFDM transmitter, and where information indicative of the selected MCS is signaled from the OFDM transmitter to the OFDM receiver.

20. An OFDM communications system as in claim 18, where the group of automata is located at the OFDM receiver, and where information that is indicative of the selected MCS is signaled from the OFDM receiver to the OFDM transmitter.

21. An OFDM communications system as in claim 17, where the selected performance criterion comprises data throughput.

22. An OFDM communications system as in claim 17, where the OFDM communications system operates by loading a plurality of data packets across the plurality of sub-carriers so that the plurality of data packets are loaded into one OFDM symbol.

23. An OFDM communications system as in claim 17, where the OFDM communications system operates by loading each sub-carrier with a data packet so that each data packet is spread across a plurality of OFDM symbols.

24. An OFDM communications system as in claim 17, further comprising means for initializing the group of automata by partitioning the switching thresholds into a pre-defined set of combinations to cover all or substantially all of a range of operating signal-to-noise ratios (SNRs); assigning one switching threshold to one of automata of the group; initializing an internal probability vector of each automaton such that the probabilities of choosing a particular action are the same; mapping each particular action of each automaton to a unique switching threshold value; and selecting an action at random with each automaton.

25. An OFDM communications system as in claim 24, where for a mode 1 operation the OFDM communications system operates by loading a plurality of data packets across the plurality of sub-carriers so that the plurality of data packets are loaded into one OFDM symbol, and further comprising means, responsive to selected switching threshold values, for determining what MCS to use in each of the sub-carriers, thereby determining how many data packets an OFDM symbol can carry; for loading the sub-carriers with the data packets; for transmitting the OFDM symbol from the OFDM transmitter; for receiving the OFDM symbol at the OFDM receiver and determining a packet error rate (PER) to determine data throughput; and means, responsive to the determined data throughput, for updating the internal probability vector of an automaton that made a switching threshold decision such that only if the selected action has resulted in good throughput performance the selection probability of the selected action is increased, thereby updating the switching threshold values, and for selecting another action at random using the updated automaton internal probability vector and, at the next OFDM symbol, assigning MCSs to the sub-carriers according to the updated switching threshold values, loading new data packets to the sub-carriers accordingly, and transmitting the next OFDM symbol.

26. An OFDM communications system as in claim 24, where for a mode 2 operation the OFDM communications system operates by loading each sub-carrier with a data packet so that each data packet is spread across a plurality of OFDM symbols, and further comprising means, responsive to selected switching threshold values, for determining what MCS to use in each of the sub-carriers, and loading each sub-carrier with a symbol from an assigned data packet; for transmitting a frame of OFDM symbols from the OFDM transmitter; for receiving the frame of OFDM symbols at the OFDM receiver and determining a packet error rate (PER) to determine data throughput; and means, responsive to the determined data throughput, for updating the internal probability vector of an automaton that made a switching threshold decision such that only if the selected action has resulted in good throughput performance the selection probability of the selected action is increased, thereby updating the switching threshold values; for selecting another action at random using the updated automaton internal probability vector and, at the first OFDM symbol of the next frame, for assigning MCSs to the sub-carriers according to the updated switching threshold values, loading a new frame of data packets to the sub-carriers accordingly, and transmitting the next frame of OFDM symbols.

27. An OFDM communications system as in claim 25, where loading the sub-channels further comprises disabling a sub-channel and not loading a data packet if the sub-channel condition is poor.

28. An OFDM communications system as in claim 26, where loading the sub-channels further comprises disabling a sub-channel and not loading a data packet if the sub-channel condition is poor.

29. An OFDM communications system as in claim 25, where one automaton learning trial is performed per OFDM symbol.

30. An OFDM communications system as in claim 26, where one automaton learning trial is performed per OFDM frame.

* * * * *